(12) United States Patent
Kinoshita et al.

(10) Patent No.: US 9,088,040 B2
(45) Date of Patent: Jul. 21, 2015

(54) CELL WIRING MODULE

(75) Inventors: Yuko Kinoshita, Yokkaichi (JP);
Hiroomi Hiramitsu, Yokkaichi (JP);
Hiroki Hirai, Yokkaichi (JP); Shinichi Takase, Yokkaichi (JP); Ryoya Okamoto, Yokkaichi (JP); Osamu Nakayama, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/129,753

(22) PCT Filed: Jun. 15, 2012

(86) PCT No.: PCT/JP2012/065339
§ 371 (c)(1),
(2), (4) Date: Dec. 27, 2013

(87) PCT Pub. No.: WO2013/005558
PCT Pub. Date: Jan. 10, 2013

(65) Prior Publication Data
US 2014/0134894 A1    May 15, 2014

(30) Foreign Application Priority Data
Jul. 5, 2011    (JP) .................................. 2011-149074

(51) Int. Cl.
*H01R 4/28* (2006.01)
*H01M 2/20* (2006.01)
(Continued)

(52) U.S. Cl.
CPC ........... *H01M 2/206* (2013.01); *B60L 11/1877* (2013.01); *H01M 2/1077* (2013.01); *H01R 11/281* (2013.01); *H01R 11/288* (2013.01); *H01M 2/20* (2013.01)

(58) Field of Classification Search
CPC ..... H01M 2/206; H01M 2/1077; H01M 2/20; H01R 11/281; H01R 11/288
USPC .................................................. 439/754–757
See application file for complete search history.

(56) References Cited

U.S. PATENT DOCUMENTS

| | | | |
|---|---|---|---|
| 7,972,185 B2 * | 7/2011 | Kim | 439/754 |
| 8,556,665 B2 * | 10/2013 | Schuppli | 439/765 |
| 8,603,663 B2 * | 12/2013 | Park et al. | 429/152 |

FOREIGN PATENT DOCUMENTS

| | | |
|---|---|---|
| JP | A-11-067184 | 3/1999 |
| JP | A-2010-225449 | 10/2010 |

(Continued)

OTHER PUBLICATIONS

International Search Report for International Application No. PCT/JP2012/065339, dated Sep. 4, 2012.
(Continued)

*Primary Examiner* — Khiem Nguyen
(74) *Attorney, Agent, or Firm* — Oliff PLC

(57) ABSTRACT

A cell wiring module includes: a plurality of coupling units that hold a plurality of connection members for electrically connecting electrode terminals of adjacent single cells; an opening end section positioned on one side of each coupling unit, and has a first engagement hole formed therein; a latching end section positioned on the other side of each coupling unit, and has a latching unit inserted into the first engagement hole of a coupling unit adjacent in the coupling direction, and latches onto the hole edge section of the first engagement hole; and a fluctuating movement restricting piece arranged at one of the opening end section and the latching end section, wherein the fluctuating movement restricting piece is inserted into a second engagement hole provided at the other of the opening end section and the latching end section of an adjacent coupling unit, and restricts fluctuating movements.

3 Claims, 21 Drawing Sheets

(51) Int. Cl.
*H01R 11/28* (2006.01)
*H01M 2/10* (2006.01)
*B60L 11/18* (2006.01)

(56) References Cited

FOREIGN PATENT DOCUMENTS

| JP | A-2011-8957 | 1/2011 |
| JP | A-2011-67012 | 3/2011 |
| JP | A-2011-77031 | 4/2011 |
| JP | A-2011-91003 | 5/2011 |
| JP | A-2011-124176 | 6/2011 |
| WO | 2010056750 A2 | 5/2010 |

OTHER PUBLICATIONS

Mar. 18, 2015 European Search Report issued in Application No. 12807244.4.

* cited by examiner

CELL WIRING MODULE

This application is the national phase of PCT International Application No. PCT/JP2012/065339 that has an International filing date of Jun. 15, 2012 and designated the United States of America and claims priority to Japanese Patent App. No. JP 2011-149074 that was filed on Jul. 5, 2011. The disclosure of the prior applications is hereby incorporated by reference herein in their entirety.

BACKGROUND

Cell modules for electric cars or hybrid cars are configured such that a plurality of single cells each having a positive electrode terminal and a negative electrode terminal are arranged in a line, and the electrode terminals of adjacent single cells are connected to each other by a connection member (busbar), thereby connecting the plurality of single cells in series and in parallel to one another (see JP 11-067184A).

In order to achieve simplification and the like of an operation for mounting the connection members, it has been proposed, as shown in JP 2011-8957A, to accommodate the connection members in a plurality of connection units made from a resin, and to mount a cell wiring module (cell connection assembly) in which these connection units are coupled to one another, as a single structural element, to the plurality of single cells.

In this JP 2011-8957A, the connection units are coupled to one another by engaging an engaging portion of each connection unit that is provided on one side in an alignment direction of the connection units with an engaged portion of each connection unit that is provided on the other side in the alignment direction.

SUMMARY

Problem to be Solved

JP 2011-8957A has a configuration in which the connection unit is provided with an engagement hole, serving as the engaging portion, on one end side in the alignment direction, and an engagement piece curved in a U-shape passes through the engagement hole from above and latches therein. However, in a case where the units are coupled to one another by the engagement piece curved in a U-shape latching on a hole edge section of the engagement hole, the strength of the coupling is likely to be impaired.

It is an object herein to provide a cell wiring module that can reliably couple between the units.

Solution to Problem

The cell wiring module is a cell wiring module that is to be attached to a single cell group in which a plurality of single cells are arranged, the single cells each having a positive electrode terminal and a negative electrode terminal. The cell wiring module includes: a plurality of coupling units that hold connection members for electrically connecting electrode terminals of adjacent single cells, and that are coupled to one another in a coupling direction; an opening end section that is positioned on one side in the coupling direction of each coupling unit, and has a first engagement hole formed therein that opens in the coupling direction; a latching end section that is positioned on the other side in the coupling direction of each coupling unit, and that has a latching unit that is inserted into the first engagement hole of the coupling unit positioned adjacent in the coupling direction and latches onto a hole edge section of the first engagement hole; and a fluctuating movement restricting piece that is arranged at one of the opening end section and the latching end section, wherein the fluctuating movement restricting piece is inserted into a second engagement hole that is provided at the other of the opening end section and the latching end section of an adjacent coupling unit, opening in the coupling direction, the fluctuating movement restricting piece restricting fluctuating movements of the adjacent coupling unit in a direction different from the coupling direction.

Since the latching unit latches on to the first engagement hole that opens in the coupling direction of the coupling units, it is possible to reliably couple the coupling units.

Here, by the latching unit latching in the first engagement hole alone, there is the risk that the latching of the latching unit may release when, for example, one of the coupling units rotates around the front end of the latching unit. However, in addition to the latching unit, the fluctuating movement restricting piece is provided that is inserted into the second engagement hole and restricts fluctuating movements in a direction different from the coupling direction, making it possible to suppress the rotation (fluctuating movements) of the coupling unit around the front end of the latching unit. Therefore, with a simple configuration, the release of the latching of the latching unit can be prevented.

It is further preferable to include, in addition to the above-described configuration, the following configuration: the latching unit includes: a plate-shaped flexible piece; and a latching projection section on the front end side of the flexible piece, the latching projection section projecting to the side perpendicular to the coupling direction, and latching onto the hole edge section of the first engagement hole.

Accordingly, it is possible, with a simple configuration, to achieve the latching of the latching unit on the hole edge section of the first engagement hole.

The fluctuating movement restricting piece is thick-walled in a thickness direction of the flexible piece.

Accordingly, it is possible, with a simple configuration, to reliably restrict rotation of the coupling unit around the front end of the latching unit.

Advantageous Effects

A cell wiring module is achieved that can couple between units with a simple configuration.

DETAILED DESCRIPTION OF THE EMBODIMENTS

Embodiment 1

Figure 1:
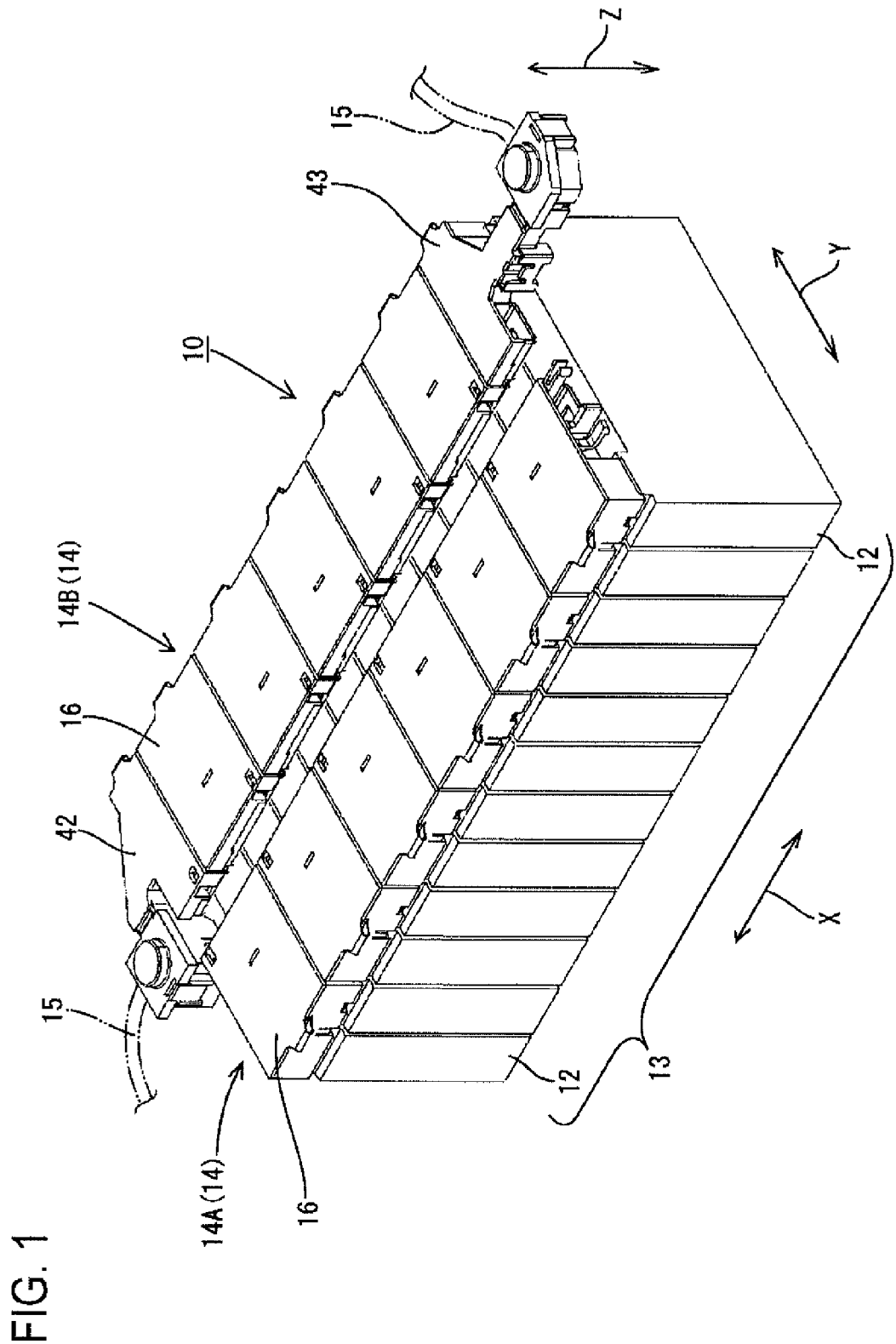
FIG. 1 is a perspective view illustrating an entire cell module to which a cell wiring module according to embodiments is attached.

An embodiment will be described with reference to FIGS. 1 to 22. A cell module 10 to which cell wiring modules 14 according to the present embodiment are attached is installed in a vehicle (not shown) such as an electric car or a hybrid car, and is used as a power supply for driving the vehicle.

The cell module (battery module) 10 includes a single cell group 13 in which a plurality of single cells 12 (twelve single cells in the present embodiment) are arranged in a line, each single cell having electrode terminals 11. The cell wiring modules 14 electrically connect the single cell group 13.

Note that, in the following description, the direction indicated by arrow X of FIG. 1 is referred to as "right and left direction". Specifically, "rightward" refers to a direction toward the front right side of FIG. 1, and "leftward" refers to a direction toward the back left side of FIG. 1. Also, the direction indicated by arrow Y of FIG. 1 is referred to as "front and back direction". Specifically, "frontward" refers to a direction toward the front left side of FIG. 1, and "backward" refers to a direction toward the back right side of FIG. 1. Also, the direction indicated by arrow Z of FIG. 1 is referred to as "up and down direction". Specifically, "downward" refers to the downward direction of FIG. 1, and "upward" refers to the upward direction of FIG. 1. Also, in the following description, there is a case where, with respect to a plurality of the same members, one reference numeral is given to one of the members and no reference numerals are given to the others.

Single Cell 12

A single cell 12 has the shape of a flat rectangular parallelepiped. A power-generation component (not shown) is accommodated in the single cell 12A. On the top surface of the single cell 12A, a pair of electrode terminals 11 is formed, projecting upward, at locations near two end sections of the single cell 12A in the front and back direction. One of the electrode terminals 11 is a positive electrode terminal, and the other is a negative electrode terminal. The external surfaces of the electrode terminals 11 are threaded. The single cells 12 are arranged such that adjacent electrode terminals 11 have different polarities. The plurality of single cells 12 are arranged in the right and left direction and constitute a single cell group 13.

Cell Wiring Module 14

A cell wiring module 14—that is arranged on the front side of FIG. 1 and connects adjacent single cells 12—is a cell wiring module 14A for coupling. A cell wiring module 14—that is arranged on the back side of FIG. 1 and connects adjacent single cells 12 and connects the single cell group 13 to an electric power conductor 15 installed in the vehicle—is a cell wiring module 14B for external connection. As the electric power conductor 15, any conductor such as an electric cable or a busbar can be used according to the needs.

Cell Wiring Module 14A for Coupling

Figure 2:
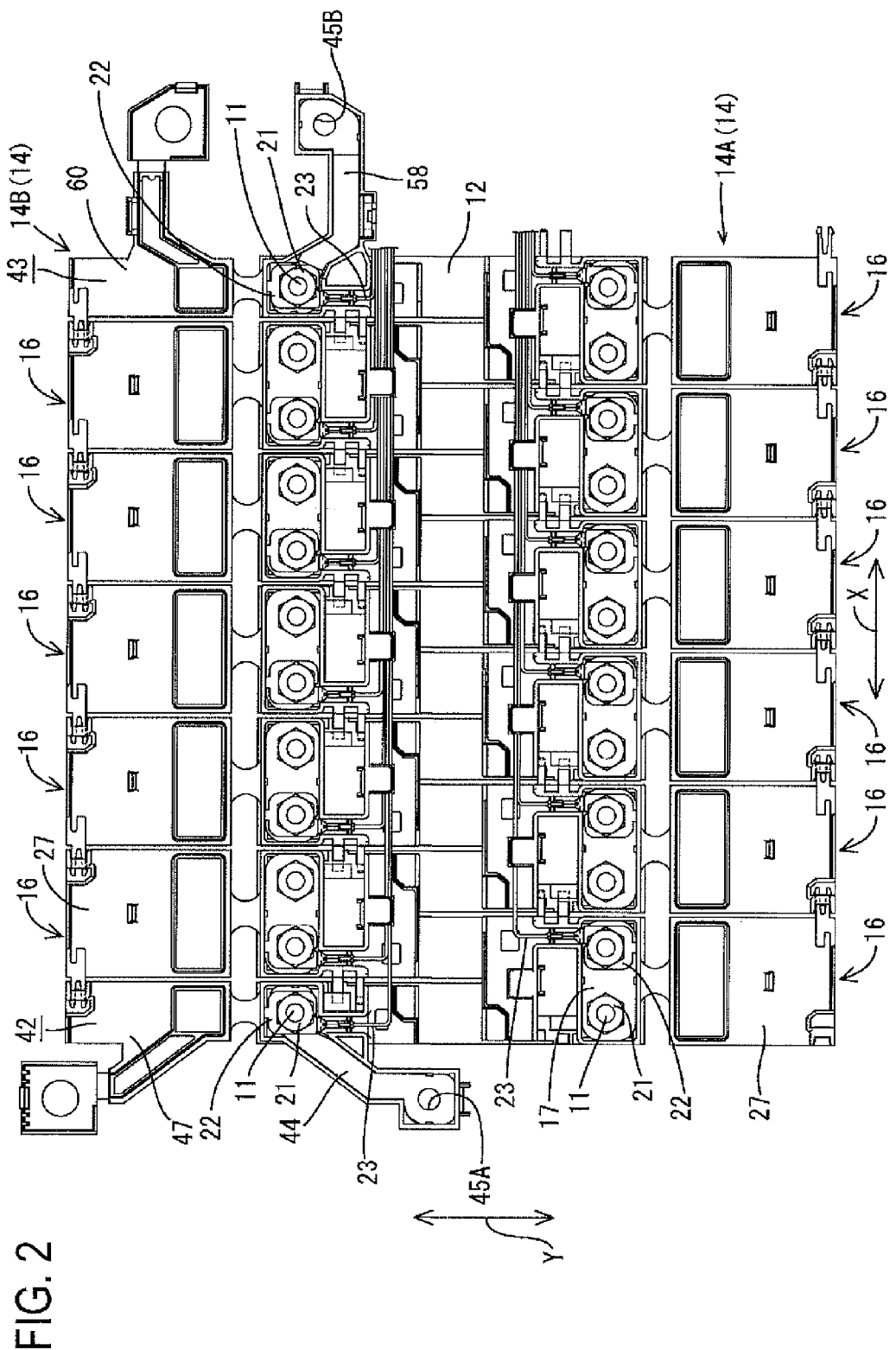
FIG. 2 is a plan view illustrating a state in which covers, a first end cover, and a second end cover of the cell module are opened.

As illustrated in FIG. 2, the cell wiring module 14A for coupling includes a plurality of coupling units 16 (six coupling units in the present embodiment) coupled in the right and left direction. The alignment direction of the coupling units 16 corresponds to the alignment direction of the single cells 12 in the single cell group 13.

Coupling Unit 16

A connection member 17 that connects electrode terminals 11 of adjacent single cells 12 is mounted on each coupling unit 16. The connection member 17 is obtained by a metal sheet material made from copper, copper alloy, SUS, or the like being pressed into a predetermined shape. The connection member 17 has the shape of a rectangle that extends in the right and left direction as seen from above. The connection member 17 has electrode terminal through holes 18A that penetrate the connection member 17 and through which the electrode terminals 11 pass.

Figure 3:
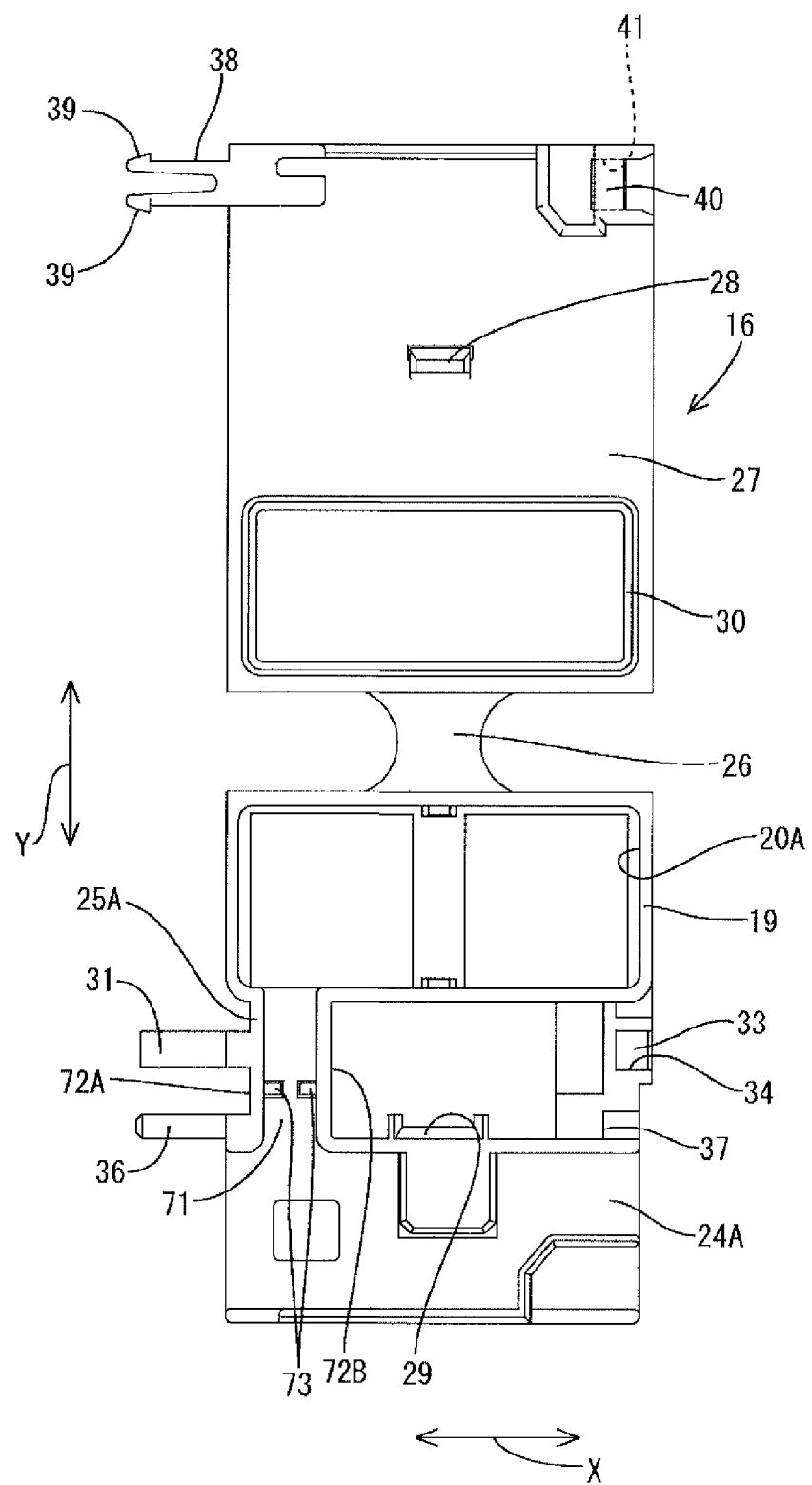
FIG. 3 is a plan view illustrating a coupling unit.

As shown in FIG. 3, the coupling unit 16 includes an accommodation section 19 made from a synthetic resin in which the connection member 17 is accommodated. The accommodation section 19 has the shape of a rectangle as seen from above, and is slightly larger than the connection member 17. The accommodation section 19 has an opening 20A that opens upward, and the connection member 17 is accommodated in the accommodation section 19 via this opening 20A.

The electrode terminals 11 are electrically connected to the connection member 17 by screwing nuts 21 on the electrode terminals 11 while the electrode terminals 11 are passed through the electrode terminal through holes 18A of the connection member 17. On one of the adjacent electrode terminals 11 that are connected to each other by the connection member 17, an electric voltage detection terminal 22 is interposed between the nut 21 and the connection member 17. Thus, the electric voltage detection terminal 22 and the electrode terminal 11 are electrically connected to each other. One end of an electric voltage detection line 23 is connected to the electric voltage detection terminal 22 by a well-known method such as crimping. The other end of the electric voltage detection line 23 is connected to an ECU (not shown).

The coupling unit 16 has an electric cable routing section 24A made from a synthetic resin in which the electric voltage detection line 23 is accommodated and routed in the right and left direction (see FIG. 3). The electric cable routing section 24A is substantially in the shape of a groove as seen in the right and left direction, and the electric voltage detection line 23 can be accommodated therein. The electric cable routing section 24A and the accommodation section 19 are coupled (or connected) to each other by a coupling section 25A made from a synthetic resin.

The coupling section 25A has the shape of a groove constituted by a plate-shaped bottom section 71 and a pair of groove walls 72A and 72B that are arranged on the left and right sides of the bottom section 71. The terminal portion of the electric voltage detection line 23 that is to be connected to the electric voltage detection terminal 22 is arranged on the bottom section 71. At top end portions of the pair of groove walls 72A and 72B, a pair of claw sections 73 projects inward and can hold the electric voltage detection line 23 in the coupling section 25.

A cover 27 made from a synthetic resin is formed integrally to the accommodation section 19 on a side surface opposite to the coupling section 25A, via a hinge 26. The cover 27 is rotatable around the hinge 26. The cover 27 is substantially rectangular as seen from above. The size of the cover 27 is set so that it can cover the accommodation section 19, the coupling section 25A, and the electric cable routing section 24A. The cover 27 is configured to be held while covering the accommodation section 19, the coupling section 25A, and the electric cable routing section 24A, by a cover lock section 28 formed on the cover 27 elastically engaging with a cover lock reception section 29 formed on the electric cable routing section 24.

The cover 27 has, on its surface facing the accommodation section 19 when the cover 27 is closed, a rib 30 that projects toward the accommodation section 19. The rib 30 is formed in a closed loop that is substantially rectangular. The rib 30 is formed so as to enter the accommodation section 19 when the cover 27 is closed. Specifically, the rib 30 is formed so as to be slightly smaller than a rim of the opening 20A of the accommodation section 19.

Engagement Structure of the Coupling Unit 16

Figure 4:
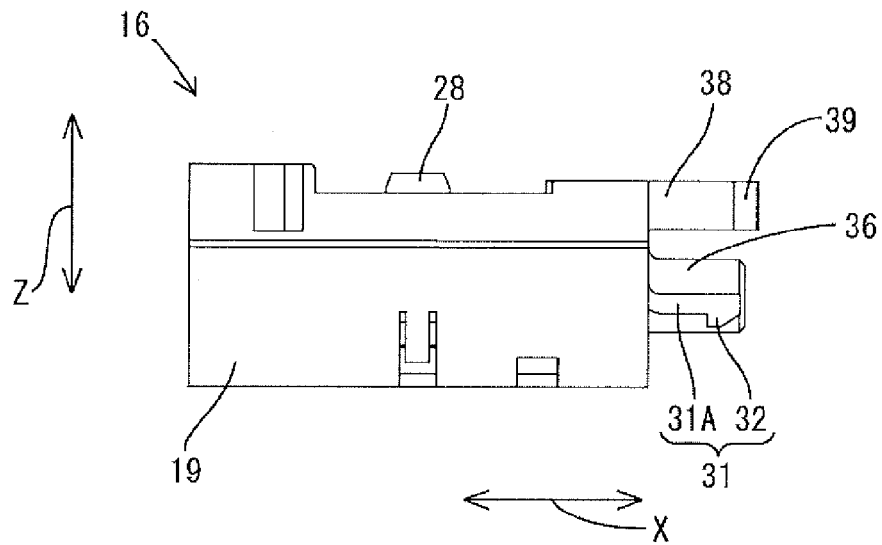
FIG. 4 is a rear view illustrating the coupling unit.

The coupling unit 16 includes, on its left end section (that corresponds to the latching end section) (at the coupling section 25A), a latching unit 31 that projects outward (in the coupling direction). As shown in FIG. 4, the latching unit 31 is constituted by a flexible piece in the shape of a plate 31A, and a latching projection section 32 at the front end section of the flexible piece 31A, the latching projection section 32 projecting downward and latching onto a hole edge section of the first engagement hole 34. Note that the above-described "downward" refers to a direction perpendicular to the coupling direction, that is, perpendicular to the connecting direction of the connection member 17.

Figure 7:
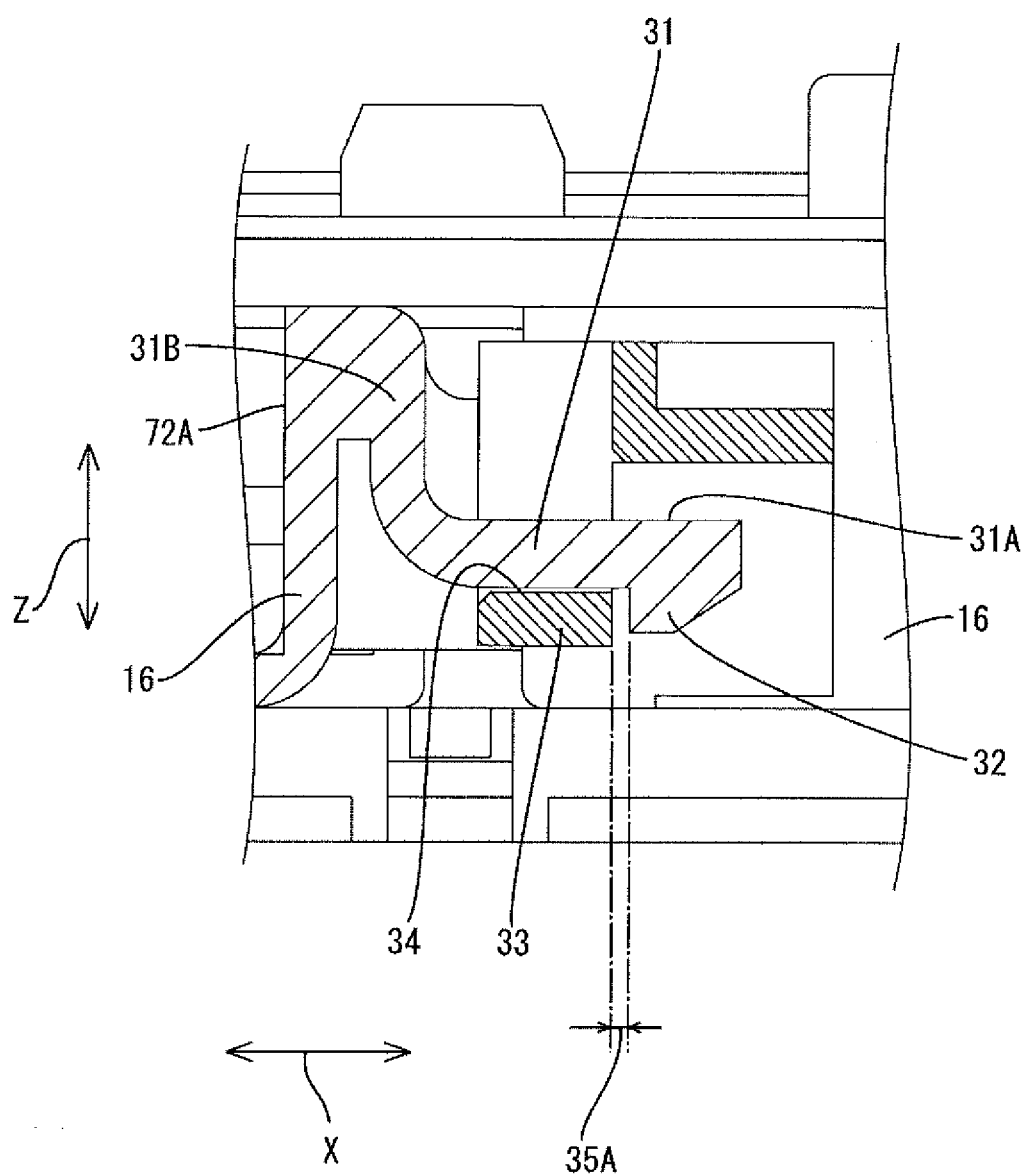
FIG. 7 is a cross-sectional view taken along the line VII-VII of FIG. 16.

As shown in FIG. 7, the flexible piece 31A is curved upward on its base end section 31B side, and this base end section 31B is integral with the top end section of the groove wall 72A of the coupling section 25. The latching projection section 32 projects downward in a stepwise manner, and is shaped such that the protrusion is reduced in size toward its front end side like a slope.

Figure 6:
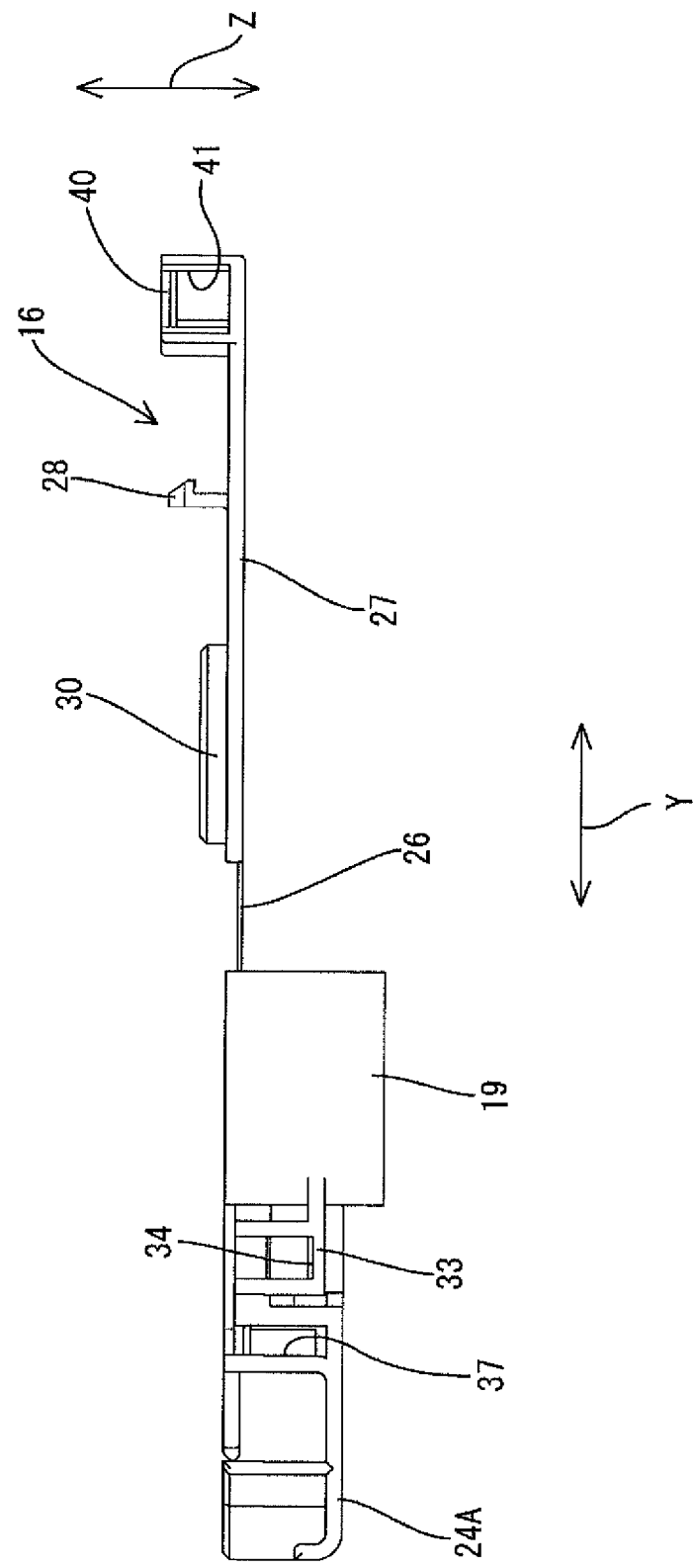
FIG. 6 is a side view illustrating the coupling unit.

As shown in FIGS. 3 and 6, the coupling unit 16 has, on its right end section (that corresponds to the opening end section), a latching reception section 33 in which the latching unit 31 latches. The latching reception section 33 is U-shaped such that it opens on its top surface side. A first engagement hole 34 provided on this latching reception section 33 penetrates in the right and left direction.

As shown in FIG. 7, the latching projection section 32 passes through the first engagement hole 34, and the step-like section of the latching projection section 32 abuts on the hole edge section of the first engagement hole 34 (the end section of the latching reception section 33 in the coupling direction). A predetermined clearance 35A is formed between the latching reception section 33 (first engagement hole 34) and the latching projection section 32. Generally, in a case where a latching structure in which a latching projection section latches onto a hole edge section of an engagement hole is employed, the predetermined clearance 35A refers to a clearance formed between the engagement hole and the latching projection section. If no such clearance 35A is formed, even a small dimension error may cause a situation in which the latching projection section cannot latch on the hole edge section of the engagement hole. In the present embodiment, the clearance 35A formed between the hole edge section of the first engagement hole 34 and the latching projection section 32 is 0.2 mm. The clearance 35A may be set to any value range according to the needs.

Figure 5:
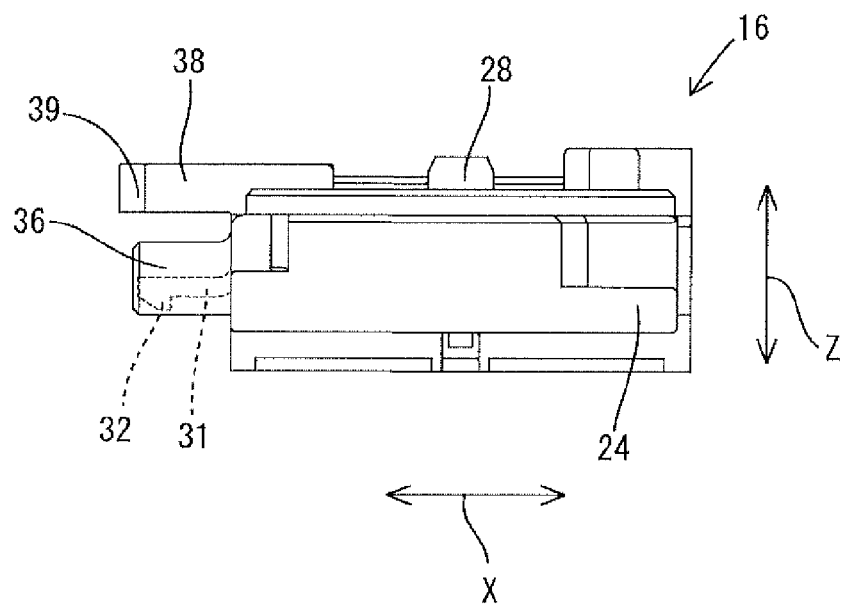
FIG. 5 is a front view illustrating the coupling unit.

As shown in FIG. 3, the coupling unit 16 includes, on its left end section (that corresponds to the latching end section), a fluctuating movement restricting piece 36 that is arranged in line with the latching unit 31 in the front and back direction (direction indicated by arrow Y of FIG. 3) and projects outward (in the coupling direction). As shown in FIGS. 3 and 5, the fluctuating movement restricting piece 36 has a flat plate-like shape in the front and back direction (direction indicated by arrow Y of FIG. 3). In other words, the fluctuating movement restricting piece 36 has a large thickness in the up and down direction (thickness direction). Therefore, the thickness direction of the latching unit 31 (the front and back direction), and the thickness direction of the fluctuating movement restricting piece 36 (the up and down direction) are in a relationship in which they are orthogonal to each other. The front end of the fluctuating movement restricting piece 36 is located at substantially the same location as the front end of the latching unit 31 in the coupling direction.

As shown in FIGS. 3 and 6, on the right end section (that corresponds to the opening end section) of the coupling unit 16, the accommodation section 19 is coupled to the electric cable routing section 24. On this coupled portion, a second engagement hole 37—into which the fluctuating movement restricting piece 36 inserted in the right and left direction (the coupling direction of the coupling units 16) is engaged—is arranged side by side with the first engagement hole 34.

The second engagement hole 37 serves as a through hole that opens in the right and left direction and through which the fluctuating movement restricting piece 36 is insertable. When the fluctuating movement restricting piece 36 is inserted (engaged), rotation (by a predetermined range or larger) around the front end of the latching unit 31 between adjacent coupling units 16 is restricted. A clearance between the fluctuating movement restricting piece 36 and the second engagement hole 37 is set to a value within a range in which this rotation (fluctuating movements) can be restricted.

Engagement Structure of the Cover 27

As shown in FIG. 3, on the left end section (one of the left and right side edges) of the cover 27, a cover engagement section 38 that projects outward is formed. The cover engagement section 38 is bifurcated, and each front end section thereof is provided with a cover engagement claw 39 that projects outward in the front and back direction (direction indicated by arrow Y of FIG. 3).

As shown in FIGS. 3 and 6, on the side edge opposite to the side edge on which the cover engagement section 38 is formed, a cover engagement reception section 40 that engages with the cover engagement section 38 is formed. The cover engagement reception section 40 has a cover engagement hole 41 through which the cover engagement claws 39 pass in the right and left direction.

Figure 8:
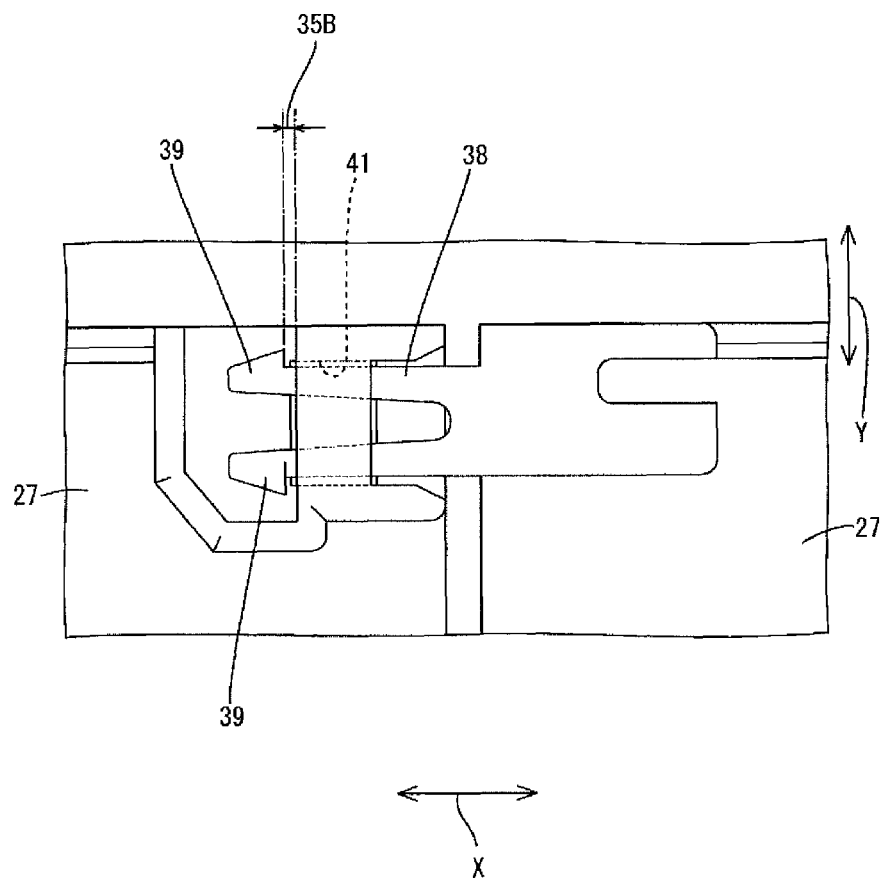
FIG. 8 is an enlarged plan view of a main portion illustrating a latching structure between a cover engagement section and a cover engagement reception section.

As shown in FIG. 8, the cover engagement claws 39 are configured to pass through the cover engagement hole 41, and abut on hole edge sections of the cover engagement hole 41 from the front side in the direction in which the cover engagement claws 39 pass through the cover engagement hole 41. A predetermined clearance 35B is formed between the cover engagement hole 41 and the cover engagement claws 39. Generally, in a case where a latching structure in which engagement claws latch on hole edge sections of an engagement hole is employed, the predetermined clearance 35B refers to a clearance that is formed between the engagement hole and the engagement claws. This is because, if this clearance 35B is not formed, even a small dimension error may cause a situation in which the engagement claws cannot latch on the hole edge sections of the engagement hole. In the present embodiment, the clearance 35B formed between the hole edge sections of the cover engagement hole 41 and the latching claws of the cover 27 is 0.2 mm. The clearance 35B may be set to any value range according to the needs.

As shown in FIG. 2, the cell wiring module 14A for coupling is obtained in such a manner that the latching units 31 engage with the first engagement holes 34 (latching reception sections 33), the fluctuating movement restricting pieces 36 engage with the second engagement holes 37, and the cover engagement sections 38 engage with the cover engagement reception sections 40, and thereby the coupling units 16 are coupled to one another in the right and left direction.

Cell Wiring Module 14B for External Connection

The cell wiring module 14B for external connection that is arranged on the rear side of FIG. 2 includes: a plurality of coupling units 16 (five coupling units 16 in the present embodiment) coupled to one another in the right and left direction; a first end coupling unit 42 that is coupled to the left end section of the coupled coupling units 16; and a second end coupling unit 43 that is coupled to the right end section of the coupled coupling units 16. The direction in which the first end coupling unit 42, the coupling units 16, and the second end coupling unit 43 are arranged is the same as the alignment direction of the single cells 12 of the single cell group 13.

First End Coupling Unit 42

As shown in FIG. 2, the first end coupling unit 42 includes a first end connection member 44 that connects the rearward electrode terminal 11 of the single cell 12 located at the left end section of the single cell group 13 to the electric power conductor 15 installed in the vehicle. The first end connection member 44 is obtained by a metal sheet material made from copper, copper alloy, SUS, and the like being pressed into a predetermined shape. The first end connection member 44 has an elongated curved shape in the front and back direction as seen from above. The first end connection member 44 has, on its rear end section, an electrode terminal through hole 18B through which the electrode terminal 11 passes, and has, on its front end section, a bolt through hole 45A through which a bolt (not shown) passes. By the bolt inserted into the bolt through hole 45A being screwed into a nut (not shown), the first end connection member 44 and the electric power conductor 15 are fixed while being sandwiched between the head portion of the bolt and the nut.

Figure 9:
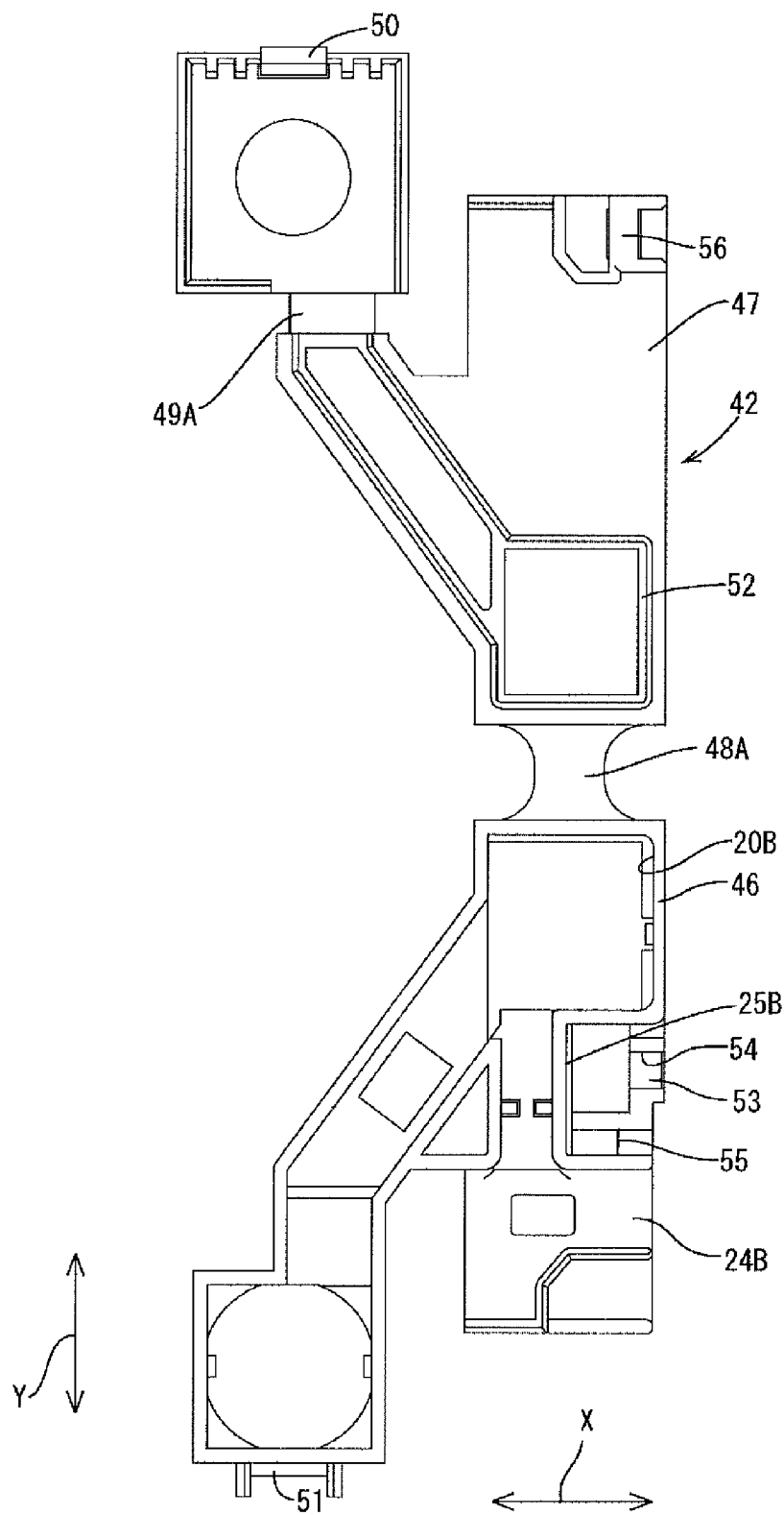
FIG. 9 is a plan view illustrating a first end coupling unit.

As shown in FIG. 9, the first end coupling unit 42 includes a first end connection member accommodation section 46 made from a synthetic resin in which the first end connection member 44 is accommodated. The first end connection member accommodation section 46 is relatively large and has a similar shape to that of the first end connection member 44 as seen from above. The first end connection member accommodation section 46 has an opening 20B that opens upward. The first end connection member 44 is accommodated in the first end connection member accommodation section 46 via this opening 20B.

The electrode terminal 11 is electrically connected to the first end connection member 44 by screwing the nut 21 on the electrode terminal 11 while the electrode terminal 11 is passed through the electrode terminal through hole 18B of the first end connection member 44. On the electrode terminal 11, the electric voltage detection terminal 22 is interposed between the nut 21 and the first end connection member 44. Accordingly, the electric voltage detection terminal 22 and the electrode terminal 11 are electrically connected to each other. One end of the electric voltage detection line 23 is connected to the electric voltage detection terminal 22 by a well-known method such as crimping. The other end of the electric voltage detection line 23 is connected to the ECU (not shown).

The first end coupling unit 42 includes an electric cable routing section 24B made from a synthetic resin in which the electric voltage detection line 23 is accommodated and routed in the right and left direction. The electric cable routing section 24B is substantially in the shape of a groove as seen in the right and left direction, and the electric voltage detection line 23 can be accommodated therein. The electric cable routing section 24B and the first end connection member accommodation section 46 are coupled to each other by a coupling section 25B made from a synthetic resin. The coupling section 25B holds the electric voltage detection terminal 22.

A first end cover 47 made from a synthetic resin is formed in one piece with the first end connection member accommodation section 46 on the side opposite to the coupling section 25B, via a main hinge 48A. The first end cover 47 is rotatable around the main hinge 48A. The first end cover 47 has a substantially similar shape to those of the first end connection member accommodation section 46, the coupling section 25B, and the electric cable routing section 24B, as seen from above. The size of the first end cover 47 is set so that it can cover the first end connection member accommodation section 46, the coupling section 25B, and the electric cable routing section 24B.

The first end cover 47 further includes a secondary hinge 49A. The first end cover 47 is formed so as to be rotatable around this secondary hinge 49A. With this secondary hinge 49A, a portion of the first end cover 47 that corresponds to the region in which the first end connection member 44 and the electric power conductor 15 are connected to each other can be opened and closed.

Figure 10:
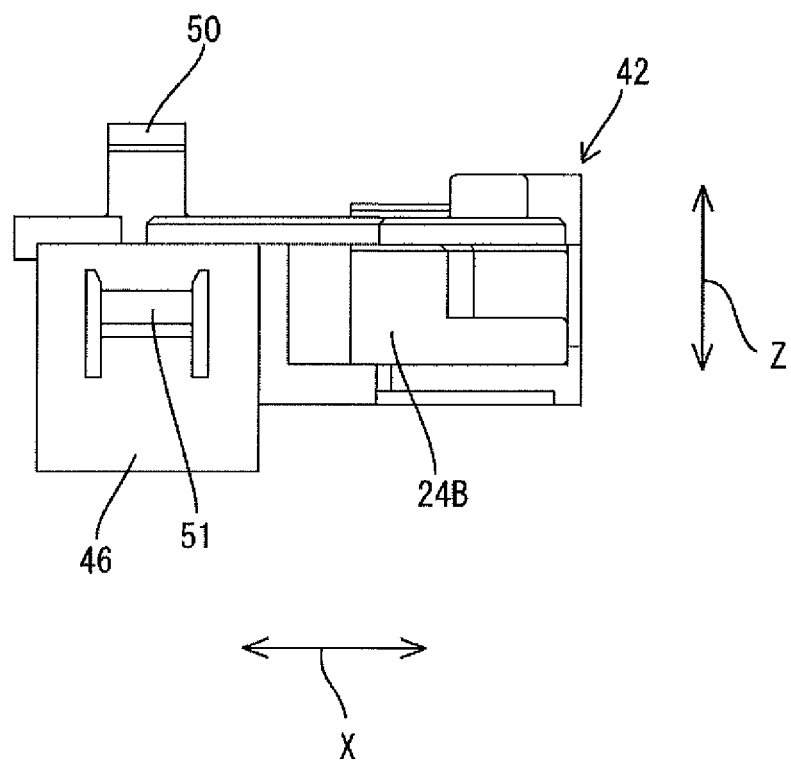
FIG. 10 is a front view illustrating the first end coupling unit.

As shown in FIG. 10, the first end cover 47 is configured to be held while covering the first end connection member accommodation section 46, the coupling section 25B, and the electric cable routing section 24B, by a first end cover lock section 50 formed on the first end cover 47 elastically engaging with a first end cover lock reception section 51 formed on the first end connection member accommodation section 46.

The first end cover 47 has, on its surface facing the first end connection member accommodation section 46 when the first end cover 47 is closed, a first end rib 52 that projects towards the first end connection member accommodation section 46 (see FIG. 9). The first end rib 52 is formed so as to enter the first end connection member accommodation section 46 in the state in which the first end cover 47 is closed.

Engagement Structure of the First End Coupling Unit 42

The first end coupling unit 42 includes, on the right side edge thereof, a first end latching reception section 53 with which the latching unit 31 formed on the coupling unit 16 arranged to the right side of the first end coupling unit 42 engages.

Figure 11:
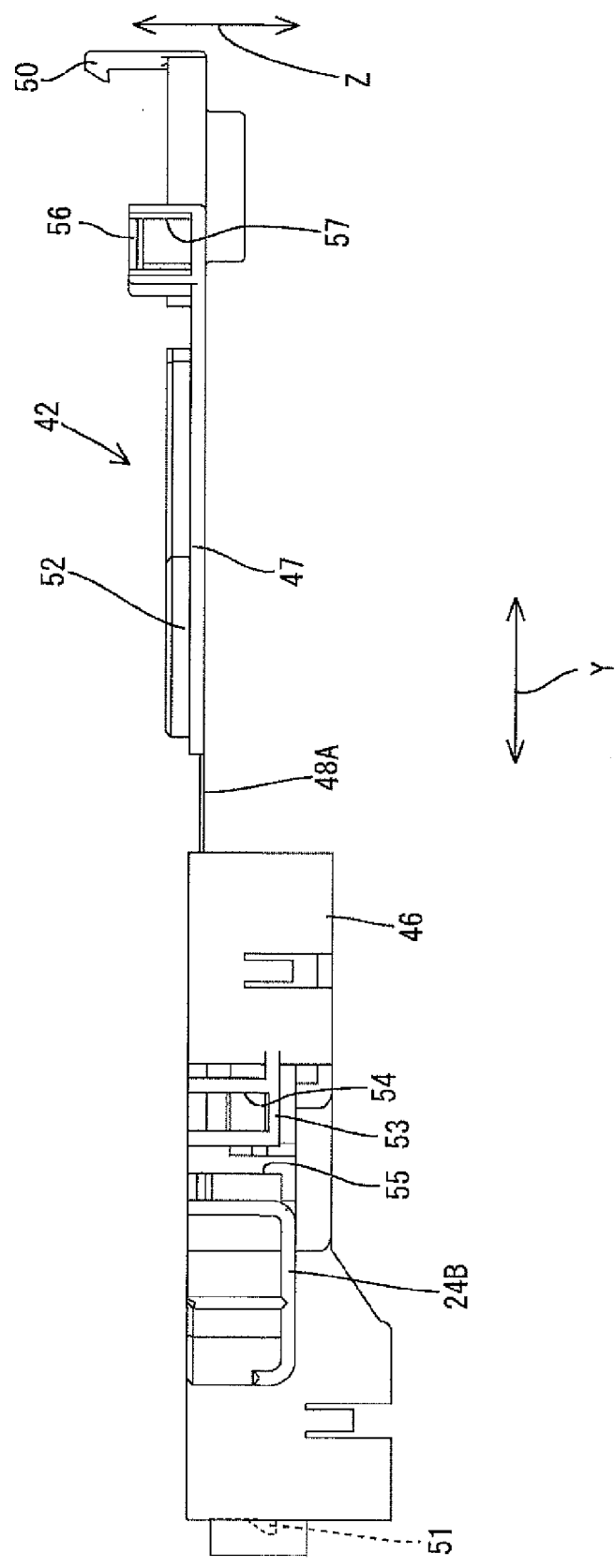
FIG. 11 is a side view illustrating the first end coupling unit.

As shown in FIGS. 9 and 11, the first end latching reception section 53 has a first end first engagement hole 54 through which the latching projection section 32 passes in the right and left direction.

The engagement structure for engagement between the latching unit 31 and the first end latching reception section 53 (the first end first engagement hole 54) is substantially the same as the engagement structure for engagement between the latching unit 31 and the latching reception section 33 (the first engagement hole 34) shown in FIG. 7, and thus its redundant description is omitted.

As shown in FIGS. 9 and 11, the first end coupling unit 42 has, on the right side edge thereof, a first end second engagement hole 55 with which the fluctuating movement restricting piece 36 formed on the coupling unit 16 arranged to the right side of the first end coupling unit 42 engages. The first end second engagement hole 55 serves as a through hole that penetrates in the right and left direction and through which the fluctuating movement restricting piece 36 can pass.

Engagement Structure of the First End Cover 47

As shown in FIGS. 9 and 11, the first end cover 47 includes, on the right side edge thereof, a first end cover engagement reception section 56 that engages with the cover engagement section 38 formed on the cover 27 of the coupling unit 16 arranged to the right side of the first end coupling unit 42. In the first end cover engagement reception section 56, a first end cover engagement hole 57, through which the cover engagement claws 39 pass, is formed penetrating in the right and left direction.

The engagement structure for engagement between the cover engagement section 38 and the first end cover engagement reception section 56 is substantially the same as the engagement structure for engagement between the cover engagement section 38 and the cover engagement reception section 40 shown in FIG. 8, and thus its redundant description is omitted.

As shown in FIG. 2, the first end coupling unit 42 is coupled to the left end section of the plurality of coupling units 16 that are coupled to each other. Specifically, the first end coupling unit 42 and the coupling units 16 are coupled to each other by the engagement structure for engagement between the latching unit 31 and the first end latching reception section 53. The engagement structure for engagement between the cover engagement section 38 and the first end cover engagement reception section 56.

Second End Coupling Unit 43

As shown in FIG. 2, the second end coupling unit 43 includes a second end connection member 58 that connects the rearward electrode terminal 11 of the single cell 12 located at the right end section of the single cell group 13 to the electric power conductor 15 installed in the vehicle. The second end connection member 58 is obtained by a metal sheet material made from copper, copper alloy, SUS, or the like being pressed into a predetermined shape. The second end connection member 58 has an elongated curved shape in the right and left direction as seen from above. The second end connection member 58 has, on its left end section, an electrode terminal through hole 18C through which the electrode terminal 11 passes, and has, on its right end section, a bolt through hole 45B through which a bolt (not shown) passes. By the bolt inserted into the bolt through hole 45B being screwed into a nut (not shown), the second end connection member 58 and the electric power conductor 15 are fixed while being sandwiched between the head portion of the bolt and the nut.

Figure 12:
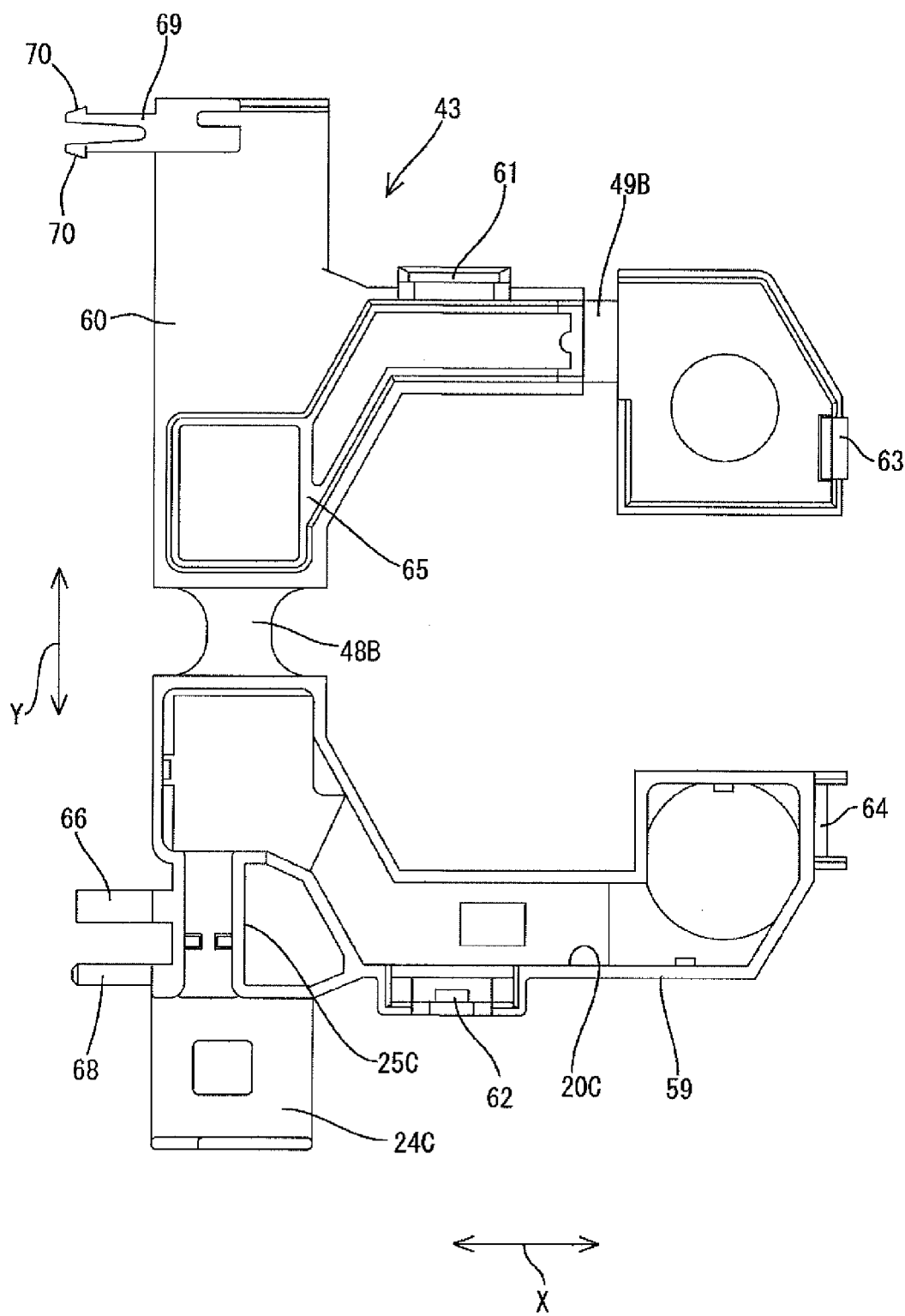
FIG. 12 is a plan view illustrating a second end coupling unit.

As shown in FIG. 12, the second end coupling unit 43 has a second end connection member accommodation section 59 made from a synthetic resin in which the second end connection member 58 is accommodated. The second end connection member accommodation section 59 is relatively large and has a similar shape to that of the second end connection member 58 as seen from above. The second end connection member accommodation section 59 has an opening 20C that opens upward and the second end connection member 58 is accommodated in the second end connection member accommodation section 59 via this opening 20C.

The electrode terminal 11 is electrically connected to the second end connection member 58 by screwing the nut 21 on the electrode terminal 11 while the electrode terminal 11 is passed through the electrode terminal through hole 18C of the second end connection member 58. On the electrode terminal 11, the electric voltage detection terminal 22 is interposed between the nut 21 and the second end connection member 58. Accordingly, the electric voltage detection terminal 22 and the electrode terminal 11 are electrically connected to each other. One end of the electric voltage detection line 23 is connected to the electric voltage detection terminal 22 by a well-known method such as crimping. The other end of the electric voltage detection line 23 is connected to the ECU (not shown).

The second end coupling unit 43 includes an electric cable routing section 24C made from a synthetic resin in which the electric voltage detection line 23 is accommodated and routed in the right and left direction. The electric cable routing section 24C is substantially in the shape of a groove as seen in the right and left direction, and the electric voltage detection line 23 can be accommodated therein. The electric cable routing section 24C and the second end connection member accommodation section 59 are coupled to each other by a coupling section 25C made from a synthetic resin. The coupling section 25C holds the electric voltage detection terminal 22.

A second end cover 60 made from a synthetic resin is formed in one piece with the second end connection member accommodation section 59 on the side opposite to the coupling section 25C, via a main hinge 48B. The second end cover 60 is rotatable around the main hinge 48B. The second end cover 60 has a substantially similar shape to those of the second end connection member accommodation section 59, the coupling section 25C, and the electric cable routing section 24C, as seen from above. The size of the second end cover 60 is set so that it can cover the second end connection member accommodation section 59, the coupling section 25C, and the electric cable routing section 24C.

Figure 14:
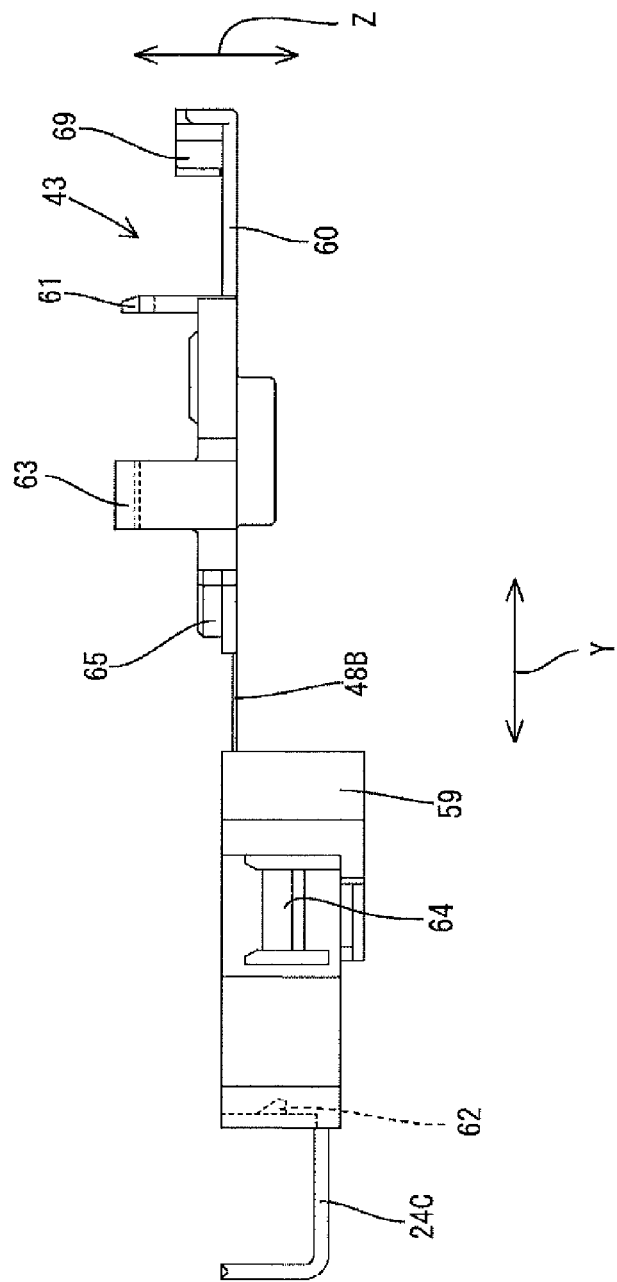
FIG. 14 is a side view illustrating the second end coupling unit.

As shown in FIG. 14, the second end cover 60 is configured to be held while covering a part of the second end connection member accommodation section 59, the coupling section 25C, and the electric cable routing section 24C, by a second end cover lock section 61 formed on the second end cover 60 elastically engaging with a second end cover lock reception section 62 formed on the second end connection member accommodation section 59.

Figure 15:
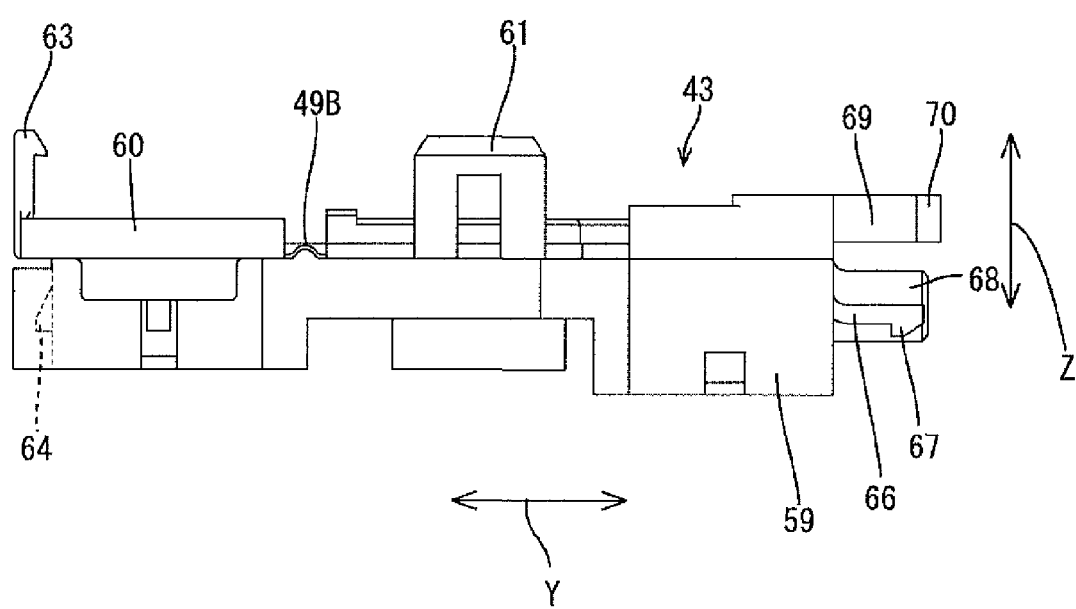
FIG. 15 is a rear view illustrating the second end coupling unit.

As shown in FIG. 15, the second end cover 60 further includes a secondary hinge 49B. The second end cover 60 is formed so as to be rotatable around this secondary hinge 49B. With this secondary hinge 49B, a portion of the second end cover 60 that corresponds to the region in which the second end connection member 58 and the electric power conductor 15 are connected to each other can be opened and closed.

Figure 13:
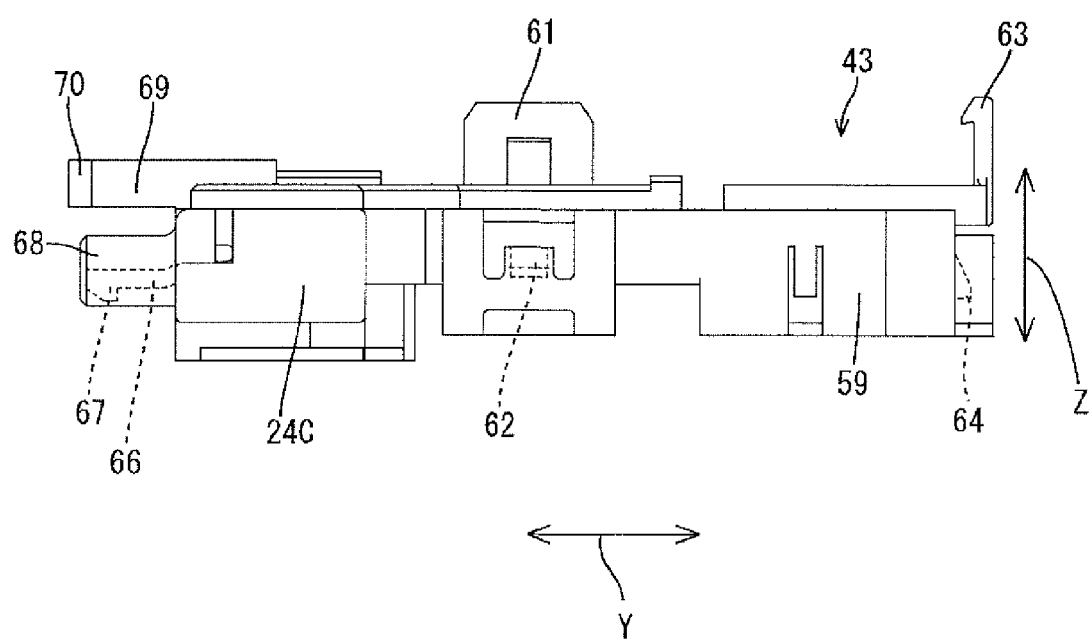
FIG. 13 is a front view illustrating the second end coupling unit.

As shown in FIG. 13, the second end cover 60 is configured to be held while covering a portion of the second end connection member accommodation section 59 that corresponds to the region in which the second end connection member 58 and the electric power conductor 15 are connected to each other, by a second end cover secondary latching portion 63 formed on the second end cover 60 elastically engaging with a second end cover secondary latching reception section 64 formed on the second end connection member accommodation section 59.

The second end cover 60 includes, on its surface facing the second end connection member accommodation section 59 when the second end cover 60 is closed, a second end rib 65 that projects towards the second end connection member accommodation section 59. The second end rib 65 is formed so as to enter the accommodation section 19 in the state in which the second end cover 60 is closed.

Engagement Structure of the Second End Coupling Unit 43

As shown in FIG. 12, the second end coupling unit 43 includes, on the left side edge thereof, a second end latching unit 66 that engages with the latching reception section 33 formed on the coupling unit 16 arranged to the left side of the second end coupling unit 43. The second end latching unit 66 is formed so as to project leftward as shown in FIG. 12. Also, as shown in FIG. 15, the second end latching unit 66 includes, on the front end thereof, a second end unit engagement claw 67 that projects downward.

The engagement structure for engagement between the second end latching unit 66 and the latching reception section 33 (the first engagement hole 34) is substantially the same as the engagement structure for engagement between the latching unit 31 and the latching reception section 33 (the first engagement hole 34) shown in FIG. 7, and thus its redundant description is omitted.

As shown in FIG. 12, the second end coupling unit 43 includes, on the left side edge thereof, a second end fluctuating movement restricting piece 68 that is arranged in line with the second end latching unit 66 in the front and back direction (direction indicated by arrow Y of FIG. 12) and projects leftward. As shown in FIGS. 12 and 13, the second end fluctuating movement restricting piece 68 has a flat plate-like shape in the front and back direction (direction indicated by arrow Y of FIG. 12). The second end fluctuating movement restricting piece 68 is configured to pass through the second engagement hole 37 formed on the coupling unit 16 arranged to the left side of the second end coupling unit 43.

Engagement Structure of the Second End Cover 60

As shown in FIG. 12, the second end cover 60 includes, on the left side edge thereof, a second end cover engagement section 69 that projects leftward. The second end cover engagement section 69 is bifurcated, and each front end section thereof is provided with a second end cover engagement claw 70 that projects outward in the front and back direction (direction indicated by arrow Y of FIG. 12). The second end cover engagement section 69 is configured to engage with the cover engagement reception section 40 of the cover 27 formed on the coupling unit 16 arranged to the left side of the second end coupling unit 43.

The engagement structure for engagement between the second end cover engagement section 69 and the cover engagement reception section 40 is substantially the same as the engagement structure for engagement between the cover engagement section 38 and the cover engagement reception section 40 shown in FIG. 8, and thus its redundant description is omitted.

As shown in FIG. 2, the second end coupling unit 43 is coupled to the right end section of the plurality of coupling units 16 that are coupled to each other. Specifically, the second end coupling unit 43 and the coupling units 16 are coupled to each other by the engagement structure for engagement between the second end latching unit 66 and the latching reception section 33 (first engagement hole 34), and the engagement structure for engagement between the second end cover engagement section 69 and the cover engagement reception section 40.

Regarding Assembly and Attachment Method

Hereinafter, an example of a method for assembling and attaching the cell wiring modules 14 will be described. First, six coupling units 16 are prepared. A latching unit 31 of one coupling unit 16 and a latching reception section 33 of another coupling unit 16 are engaged with each other for all of the coupling units in order in the right and left direction. A cover engagement section 38 of one coupling unit 16 and a cover engagement reception section 40 of another coupling unit 16 are engaged with each other for all of the coupling units in order in the right and left direction. With this, five coupling units 16 are coupled to one another in the right and left direction. At that time, since the latching unit 31 latches on the hole edge section of the first engagement hole 34 and the fluctuating movement restricting piece 36 engages in the second engagement hole 37, and thereby a relative movement of two units 16 in a direction other than the coupling direction is restricted, rotation (fluctuating movements) around the front end of the latching unit 31—which may release the latching of the latching unit 31 on the hole edge section of the first engagement hole 34—is unlikely to occur. The two coupling units 16 are relatively stably coupled to each other.

Then, connection members 17 are respectively installed into accommodation sections 19 of the coupling units 16.

Figure 16:
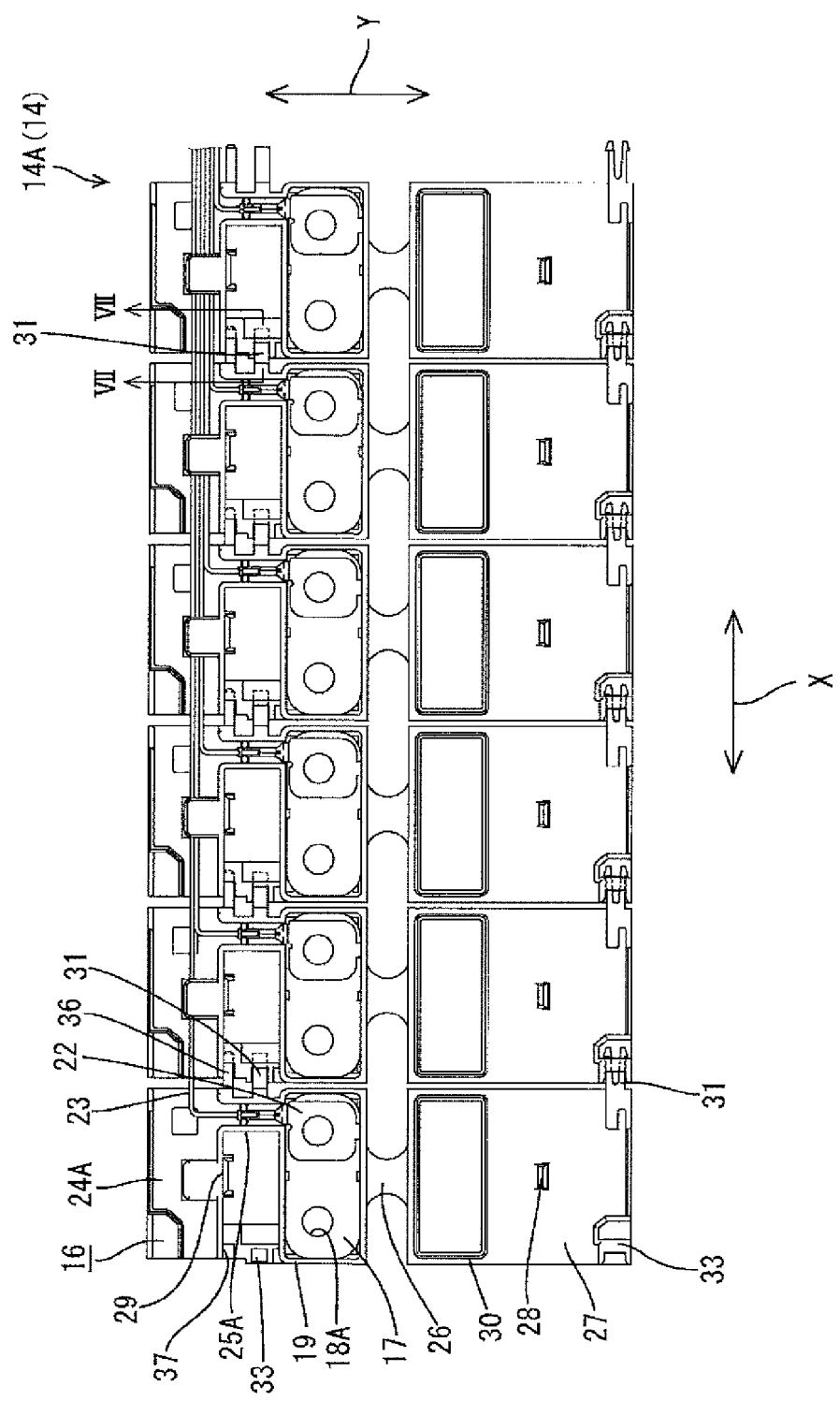
FIG. 16 is a plan view illustrating a cell wiring module for coupling.

Then, electric voltage detection terminals 22 are crimped on one end of electric voltage detection lines 23 so as to be connected to the electric voltage detection lines 23. The electric voltage detection lines 23 are routed in the electric cable routing sections 24A of the coupled coupling units 16. The electric voltage detection terminals 22 are respectively held in the coupling sections 25A and arranged in the accommodation sections 19. With this, as shown in FIG. 16, the cell wiring module 14A for coupling is completed.

Next, one first end coupling unit 42, five coupling units 16, and one second end coupling unit 43 are prepared. The first end latching reception section 53 of the first end coupling unit 42 is engaged with the engaging portion of a coupling unit 16 in the right and left direction. The first end cover engagement reception section 56 of the first end coupling unit 42 is engaged with the cover engagement section 38 of the coupling unit 16 in the right and left direction. Also, a latching unit 31 of one coupling unit 16 is engaged with a latching reception section 33 (first engagement hole 34) of another coupling unit 16 in the right and left direction. A cover engagement section 38 of one coupling unit 16 is engaged with a cover engagement reception section 40 of another coupling unit 16 in the right and left direction. Also, the latching reception section 33 of the coupling unit 16 is engaged with the second end latching unit 66 of the second end coupling unit 43 in the right and left direction, and the cover engagement reception section 40 of the coupling unit 16 is engaged with the second end cover engagement section 69 of the second end coupling unit 43 in the right and left direction.

Then, the first end connection member 44 is accommodated in the first end connection member accommodation section 46 of the first end coupling unit 42. Further, the connection members 17 are accommodated in the respective accommodation sections 19 of the coupling units 16. Moreover, the second end connection member 58 is accommodated in the second end connection member accommodation section 59 of the second end coupling unit 43.

Figure 17:
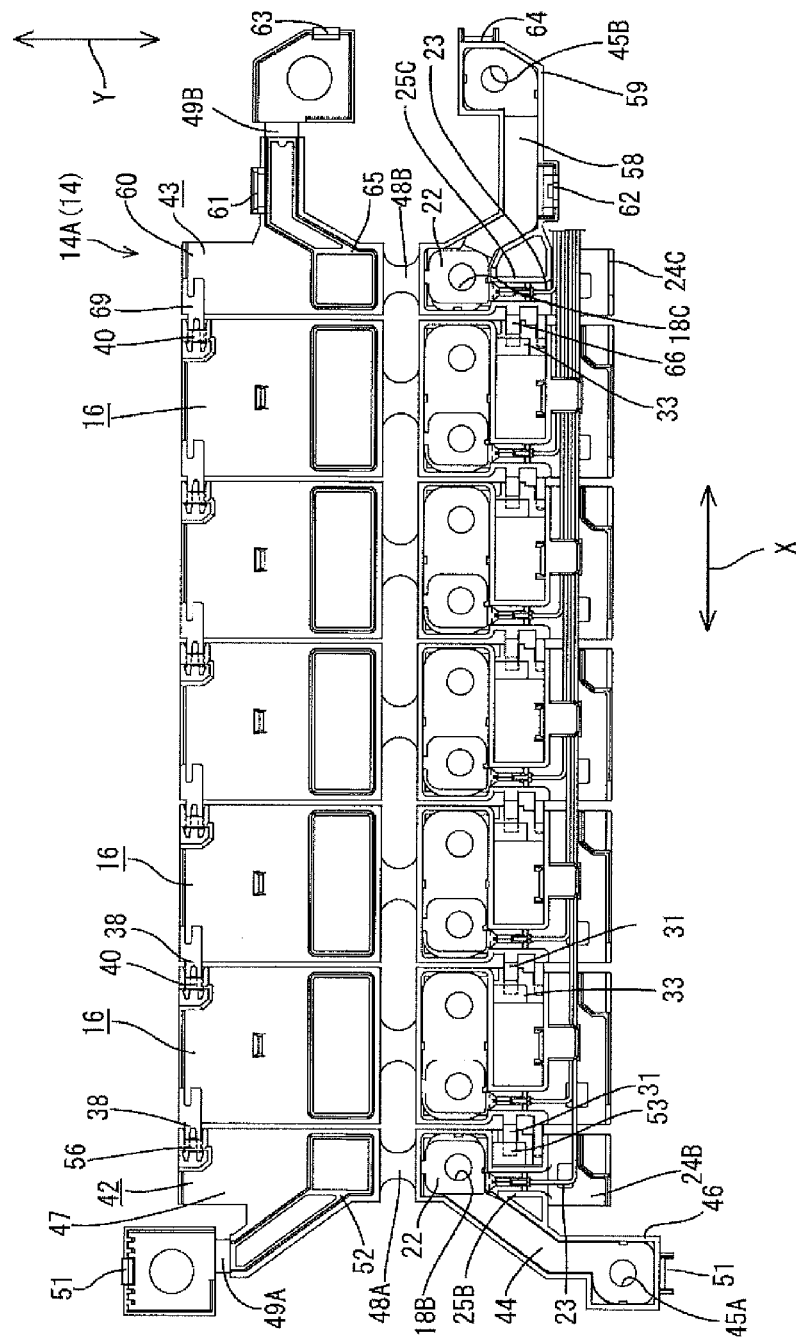
FIG. 17 is a plan view illustrating a cell wiring module for external connection.
Figure 18:
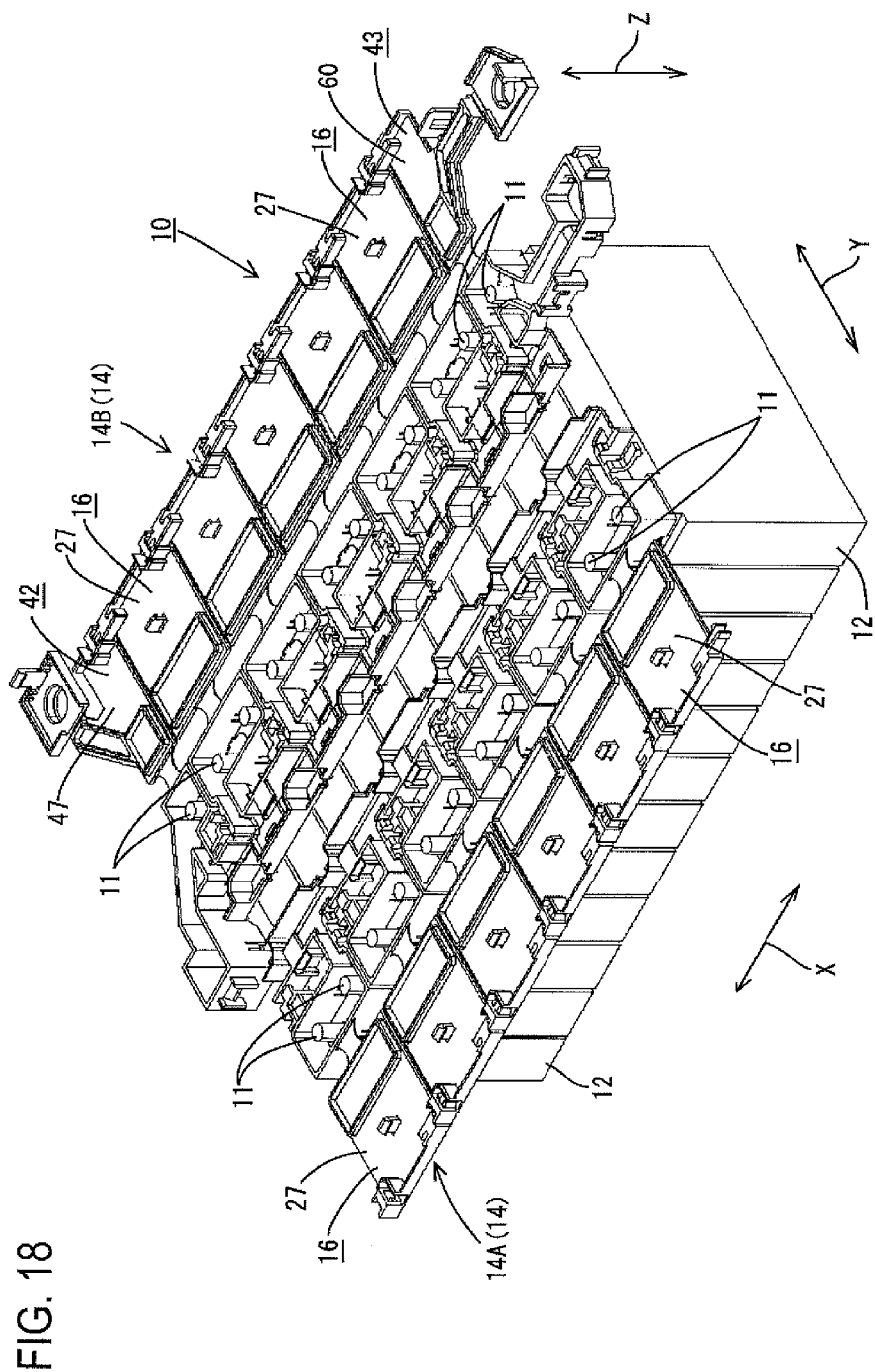
FIG. 18 is a perspective view illustrating a state in which the cell wiring modules are attached to a single cell group.
Figure 19:
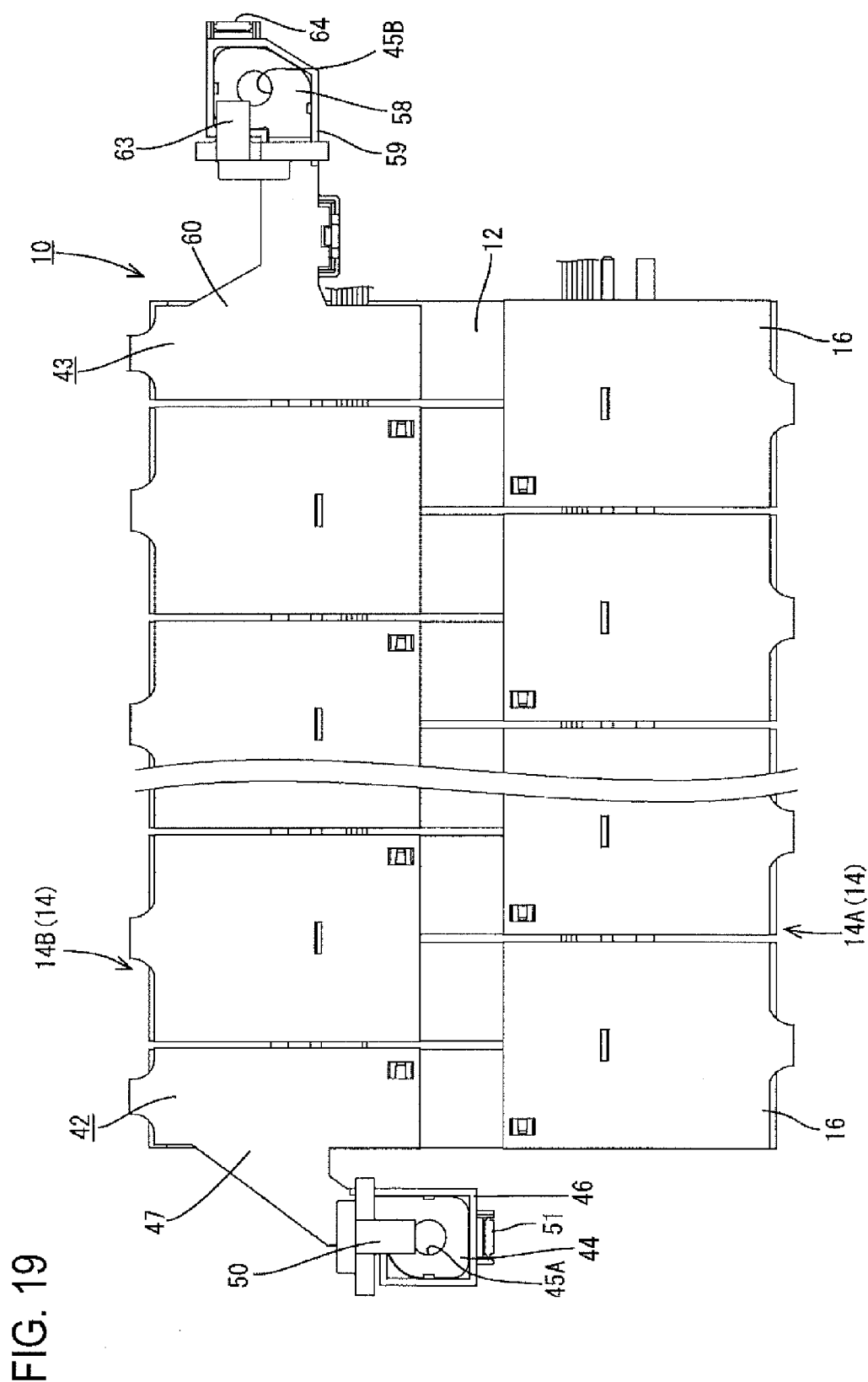
FIG. 19 is a plan view illustrating a state in which the first and second end covers are opened by secondary hinges.
Figure 20:
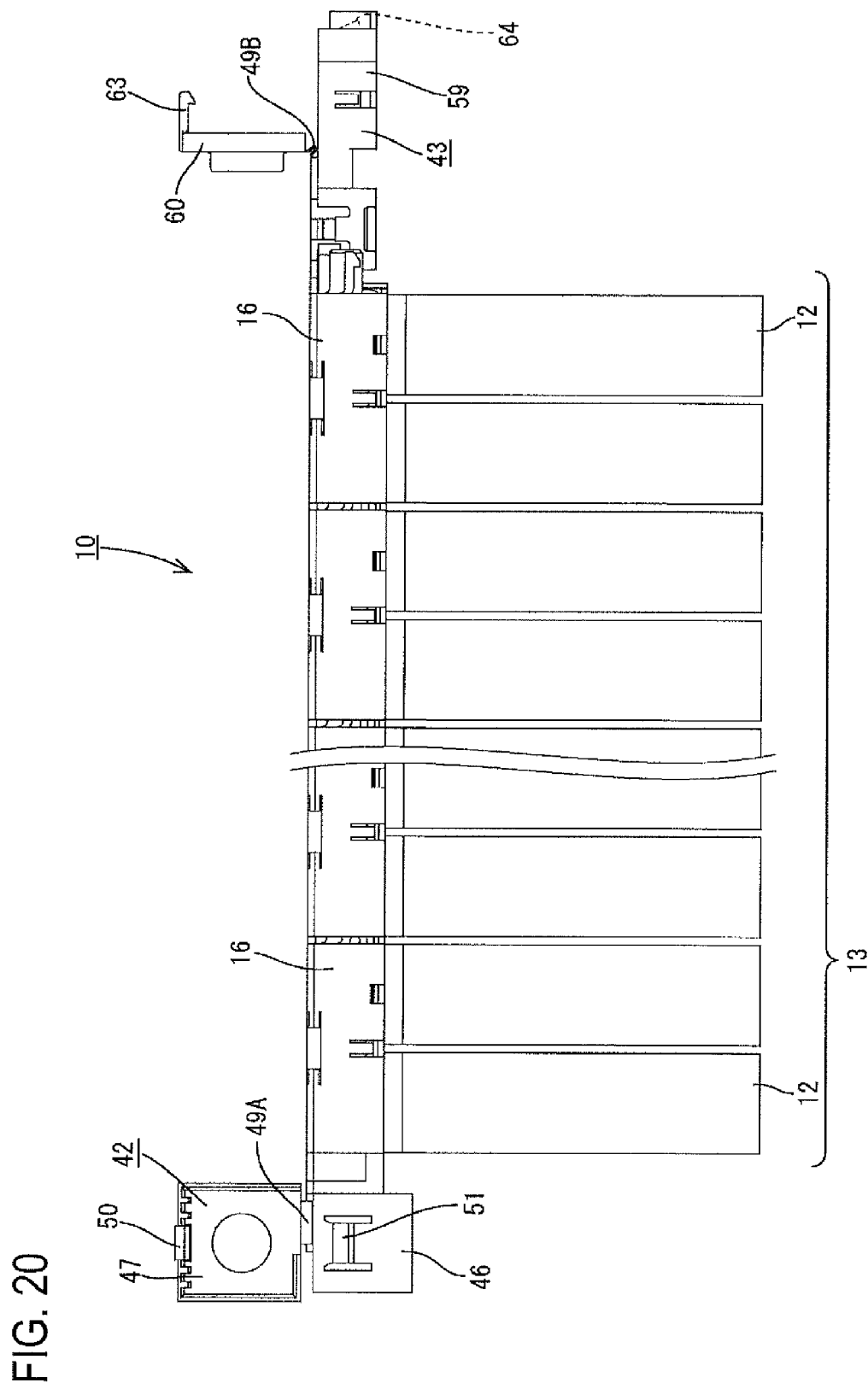
FIG. 20 is a side view illustrating the state in which the first and second end covers are opened by the secondary hinges.
Figure 21:
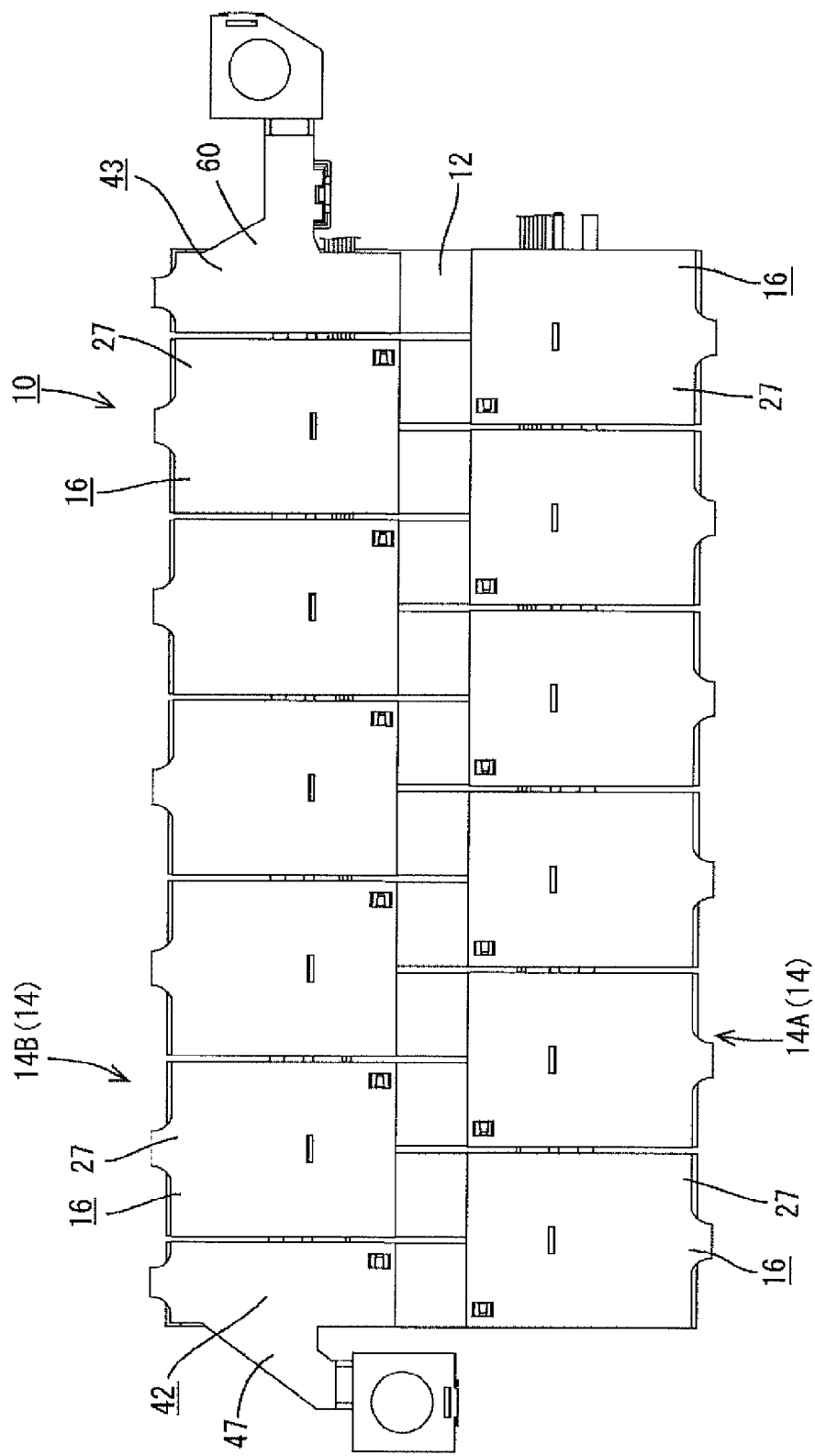
FIG. 21 is a plan view illustrating a state in which the first and second end covers are closed by the secondary hinges.
Figure 22:
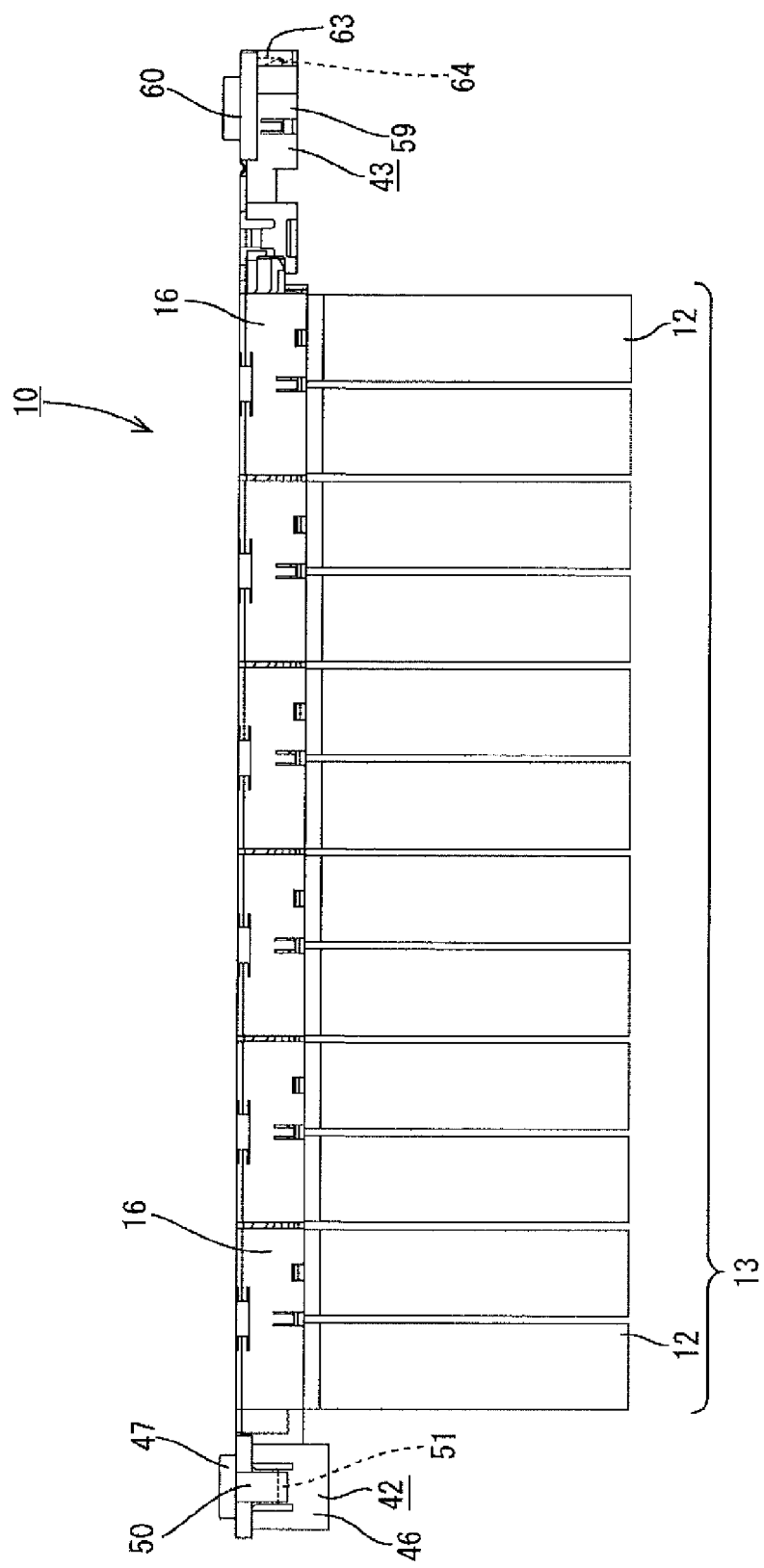
FIG. 22 is a side view illustrating the state in which the first and second end covers are closed by the secondary hinges.

Then, electric voltage detection terminals 22 are crimped on one end of the electric voltage detection lines 23 so as to be connected to the electric voltage detection lines 23. The electric voltage detection lines 23 are respectively routed in the electric cable routing sections 24A, 24B, and 24C of the first end coupling unit 42, the coupling units 16, and the second end coupling unit 43 that are coupled to one another. The electric voltage detection terminals 22 are held in the coupling sections 25A, 25B, and 25C, and arranged in the first end connection member accommodation section 46, the accommodation sections 19, and the second end connection member accommodation section 59. With this, as shown in FIG. 17, the cell wiring module 14B for external connection is completed.

Subsequently, twelve single cells 12 are arranged in line, with the surface on which the electrode terminals 11 are formed facing upward. With respect to the single cells 12, the electrode terminals 11 of each single cell 12 are arranged in the front and back direction, and twelve electrode terminals 11 are aligned in the right and left direction. Then, the cell wiring module 14A for coupling is attached to the electrode terminals 11 that are located on the front side of the single cell group 13 from above. At that time, the electrode terminals 11 pass through the electrode terminal through holes 18A of the connection members 17.

Then, the cell wiring module 14B for external connection is attached to the electrode terminals 11 that are located on the rear side of the single cell group 13 from above. At that time, the electrode terminals 11 pass through the electrode terminal through hole 18B of the first end connection member 44, the electrode terminal through holes 18A of the connection members 17, and the electrode terminal through hole 18C of the second end connection member 58 (see FIG. 18).

Then, the nuts 21 are screwed on the respective electrode terminals 11. Accordingly, the twelve single cells 12 are connected in series (see FIG. 2).

Subsequently, with respect to the cell wiring module 14A for coupling, the coupled covers 27 are rotated around the hinges 26, and are closed so as to cover the accommodation sections 19, the coupling sections 25A, and the electric cable routing sections 24A. At that time, the covers 27 are held—while being closed—by the cover lock sections 28 elastically engaging with the cover lock reception sections 29.

Then, with respect to the cell wiring module 14B for external connection, the first end cover 47, the covers 27, and the second end cover 60 that are coupled to one another are rotated around the main hinges 48A and 48B, and the hinge 26, and are closed so as to cover the accommodation section 19, the coupling sections 25A, 25B, and 25C, and the electric cable routing sections 24A, 24B, and 24C. At that time, the first end cover 47, the covers 27, and the second end cover 60 that are coupled to one another are held—while being closed—by the cover lock sections 28 elastically engaging with the cover lock reception sections 29, and the second end cover lock section 61 elastically engaging with the second end cover lock reception section 62 formed on the second end connection member accommodation section 59.

In this state, the portion of the first end coupling unit 42 that corresponds to the region in which the first end connection member 44 is connected to the external conductor. The portion of the second end coupling unit 43 that corresponds to the region in which the second end connection member 58 is connected to the external conductor can be opened and closed around the secondary hinges 49 (see FIGS. 19 and 20).

Subsequently, the electric power conductor 15 installed in the vehicle is connected to the first end connection member 44 by bolting. Also, the electric power conductor 15 is connected to the second end connection member 58 by bolting. Then, the first end cover 47 is rotated around the secondary hinge 49A, and the first end cover lock section 50 is elastically engaged with the first end cover lock reception section 51. With this, the first end cover 47 is held while covering the first end connection member accommodation section 46. Also, the second end cover 60 is rotated around the secondary hinge 49B, and the second end cover secondary latching portion 63 is elastically engaged with the second end cover secondary latching reception section 64. With this, the second end cover 60 is held while covering the second end connection member accommodation section 59 (see FIGS. 1, 21, and 22). Thus, the cell module 10 is completed.

Functions and Effects of the Present Embodiment

A cell wiring module 14 that is to be attached to a single cell group 13 in which a plurality of single cells 12 are arranged, the single cells 12 each having electrode terminals 11, that is, a positive terminal and a negative terminal, the cell wiring module 14 including: a plurality of coupling units 16 that hold a plurality of connection members 17 for electrically connecting electrode terminals 11 of adjacent single cells 12; an opening end section that is positioned on one side in a coupling direction of each coupling unit 16, and has a first engagement hole 34 that opens in the coupling direction; a latching end section that is positioned on the other side in the coupling direction of each coupling unit 16, and has a latching unit 31 that is inserted into the first engagement hole 34 of the coupling unit 16 positioned adjacent in the coupling direction and latches on a hole edge section of the first engagement hole 34; and a fluctuating movement restricting piece 36 that is arranged in one of the opening end section and the latching end section, wherein the fluctuating movement restricting piece 36 is inserted into a second engagement hole 37 that is provided in the other of the opening end section and the latching end section of an adjacent coupling unit, opening in the coupling direction, the fluctuating movement restricting piece 36 restricting fluctuating movements of the adjacent coupling unit 16 in a direction different from the coupling direction (insertion direction).

According to the present embodiment, the latching unit 31 latches onto the hole edge section of the first engagement hole 34 of the coupling unit 16 that opens in the coupling direction, making it possible to reliably couple between the coupling units 16.

Here, by the latching unit 31 latching in the first engagement hole 34 alone, there is the risk that the latching of the latching unit 31 may be released when, for example, one of the units rotates around the front end of the latching unit 31. However, in the present embodiment, in addition to the latching unit 31, the fluctuating movement restricting piece 36 is inserted into the second engagement hole 37 and restricts fluctuating movements in a direction different from the coupling direction, making it possible to suppress the rotation (fluctuating movements) of the coupling unit 16 around the front end of the latching unit 31. Therefore, with a simple configuration, the latching of the latching unit 31 can be prevented from being released.

The latching unit 31 is constituted by the flexible piece 31A in the shape of a plate, and the latching projection section 32 on the front end side of the flexible piece 31A, the latching projection section 32 projecting to the side perpendicular to the coupling direction, and latching on the hole edge section of the first engagement hole 34. It is thus possible, with a simple configuration, to achieve the latching of the latching unit 31 on the hole edge section of the first engagement hole 34.

The fluctuating movement restricting piece 36 is thick-walled in the thickness direction of the flexible piece 31A. It is thus possible, with a simple configuration, to reliably restrict the rotation of the coupling unit 16 around the front end of the latching unit 31.

Other Embodiments

The present invention is not limited to the embodiment described above with reference to the drawings, and the technical scope of the present invention also encompasses the following embodiments, for example.

(1) Although the above-described embodiment has a configuration in which the first engagement hole 34 and the second engagement hole 37 are provided on the right end side of the coupling unit 16 (one side, that is, the opening end section in the coupling direction), and the latching unit 31 and the fluctuating movement restricting piece 36 are provided on the left end side of the coupling unit 16 (the other side, that is, the latching end section in the coupling direction), the present invention is not limited to this and the latching unit 31 and the fluctuating movement restricting piece 36 (the first engagement hole 34 and the second engagement hole 37) may be provided on the different side in the coupling direction of the coupling unit 16. Specifically, a configuration is also possible in which the first engagement hole 34 and the fluctuating movement restricting piece 36 are provided on one side (the opening end section side) of the coupling unit 16 in the coupling direction, and the second engagement hole 37 and the latching unit 31 are provided on the other side of the coupling unit 16 in the coupling direction (the latching end section side).

(2) A configuration is also possible in which the latching unit 31 and the first engagement hole 34 are engaged with each other without a clearance therebetween. For example, the latching unit may be press-fit in the first engagement hole 34.

(3) Although the present embodiment employs the configuration in which twelve cells are connected in series, the present invention is not limited to this and may employ another configuration in which two to eleven cells, or thirteen cells or more are connected in series. Alternatively, a configuration is also possible in which a plurality of cells are connected in parallel.

(4) Although the present embodiment employs the configuration in which five or six coupling units 16 are coupled to each other, the present invention is not limited to this and may employ another configuration in which any number, such as two to four, or seven or more of the coupling units 16 are coupled to each other according to the needs.

The invention claimed is:

1. A cell wiring module that is to be attached to a single cell group in which a plurality of single cells are arranged, the single cells each having a positive electrode terminal and a negative electrode terminal, the cell wiring module comprising:
    a plurality of coupling units that hold connection members for electrically connecting electrode terminals of adjacent single cells, and are coupled to one another in a coupling direction;
    an opening end section that is positioned on one side in the coupling direction of each coupling unit, and has a first engagement hole formed therein that opens in the coupling direction;
    a latching end section that is positioned on the other side in the coupling direction of each coupling unit, and has a latching unit that is inserted into the first engagement hole of the coupling unit positioned adjacent in the coupling direction and latches onto a hole edge section of the first engagement hole; and
    a fluctuating movement restricting piece that is arranged at one of the opening end section and the latching end section,
    wherein the fluctuating movement restricting piece is inserted into a second engagement hole opening in the coupling direction that is provided at the other of the opening end section and the latching end section of an adjacent coupling unit, the fluctuating movement restricting piece restricting fluctuating movements of the adjacent coupling unit in a direction different from the coupling direction.

2. The cell wiring module according to claim 1, wherein the latching unit includes a plate-shaped flexible piece, and
wherein latching projection section on the front end side of the flexible piece, the latching projection section projecting to the side perpendicular to the coupling direction, and latching onto the hole edge section of the first engagement hole.

3. The cell wiring module according to claim 2, wherein the fluctuating movement restricting piece is thick-walled in a thickness direction of the flexible piece.

* * * * *